(12) United States Patent
Kuze et al.

(10) Patent No.: US 7,349,298 B2
(45) Date of Patent: Mar. 25, 2008

(54) OPTICAL DISC DRIVE INCLUDING DETECTION AND CORRECTION OF SPHERICAL ABERRATION

(75) Inventors: Yuichi Kuze, Settsu (JP); Katsuya Watanabe, Nara (JP); Shinichi Yamada, Katano (JP); Kosei Sano, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 349 days.

(21) Appl. No.: 10/679,171

(22) Filed: Oct. 2, 2003

(65) Prior Publication Data

US 2004/0066717 A1    Apr. 8, 2004

(30) Foreign Application Priority Data

Oct. 2, 2002   (JP)  ............... 2002-290084

(51) Int. Cl.
 *G11B 7/095* (2006.01)
(52) U.S. Cl. .................. 369/44.29; 369/44.41
(58) Field of Classification Search ............ 369/44.29, 369/44.41, 44.24; G11B 7/095
See application file for complete search history.

(56) References Cited

U.S. PATENT DOCUMENTS

| | | | | |
|---|---|---|---|---|
| 4,920,527 A | * | 4/1990 | Maeda | ............. 369/44.23 |
| 5,774,444 A | * | 6/1998 | Shimano et al. | ........ 369/110.02 |
| 6,229,600 B1 | | 5/2001 | Martynov | |
| 6,399,932 B1 | * | 6/2002 | Wals | ............. 250/201.5 |
| 6,430,137 B1 | | 8/2002 | Saimi et al. | |
| 6,473,378 B2 | | 10/2002 | Sato et al. | |
| 6,498,330 B1 | * | 12/2002 | Yoshida | ............. 250/201.5 |
| 6,862,260 B2 | * | 3/2005 | Okazaki | ............. 369/124.01 |
| 2001/0028614 A1 | | 10/2001 | Furukawa | |
| 2001/0040844 A1 | | 11/2001 | Sato et al. | |
| 2002/0041542 A1 | | 4/2002 | Sano et al. | |
| 2002/0048243 A1 | * | 4/2002 | Yanagisawa et al. | ..... 369/53.19 |
| 2004/0218484 A1 | * | 11/2004 | Kuze et al. | ........... 369/44.23 |

FOREIGN PATENT DOCUMENTS

| | | |
|---|---|---|
| JP | 2001-307349 A | 11/2001 |
| JP | 2002-039914 A | 2/2002 |
| JP | 2002-039915 A | 2/2002 |
| JP | 2002-055024 A | 2/2002 |

\* cited by examiner

*Primary Examiner*—A M Psitos
(74) *Attorney, Agent, or Firm*—Panitch Schwarze Belisario & Nadel LLP

(57) ABSTRACT

The optical disc drive reads and/or writes data from/on an optical disc having an information storage layer. In an optical disc drive 100, light from a light source 3 is focused by a focusing section 1, and each of the peripheral and non-peripheral part of light reflected by the information storage layer is received by a photodetector 4. Then, for each part of light, the drive 100 generates a focus signal and a light quantity signal, and normalizes the focus signal based on the light quantity signal. As a result, it is possible to generate a spherical aberration signal according to a quantity of spherical aberration produced at the focusing position of the light. Hence, the signal is not affected by defocusing and thus it is possible to precisely detect a spherical aberration caused by an uneven thickness of the disc and to detect a spherical aberration with high accuracy.

6 Claims, 18 Drawing Sheets

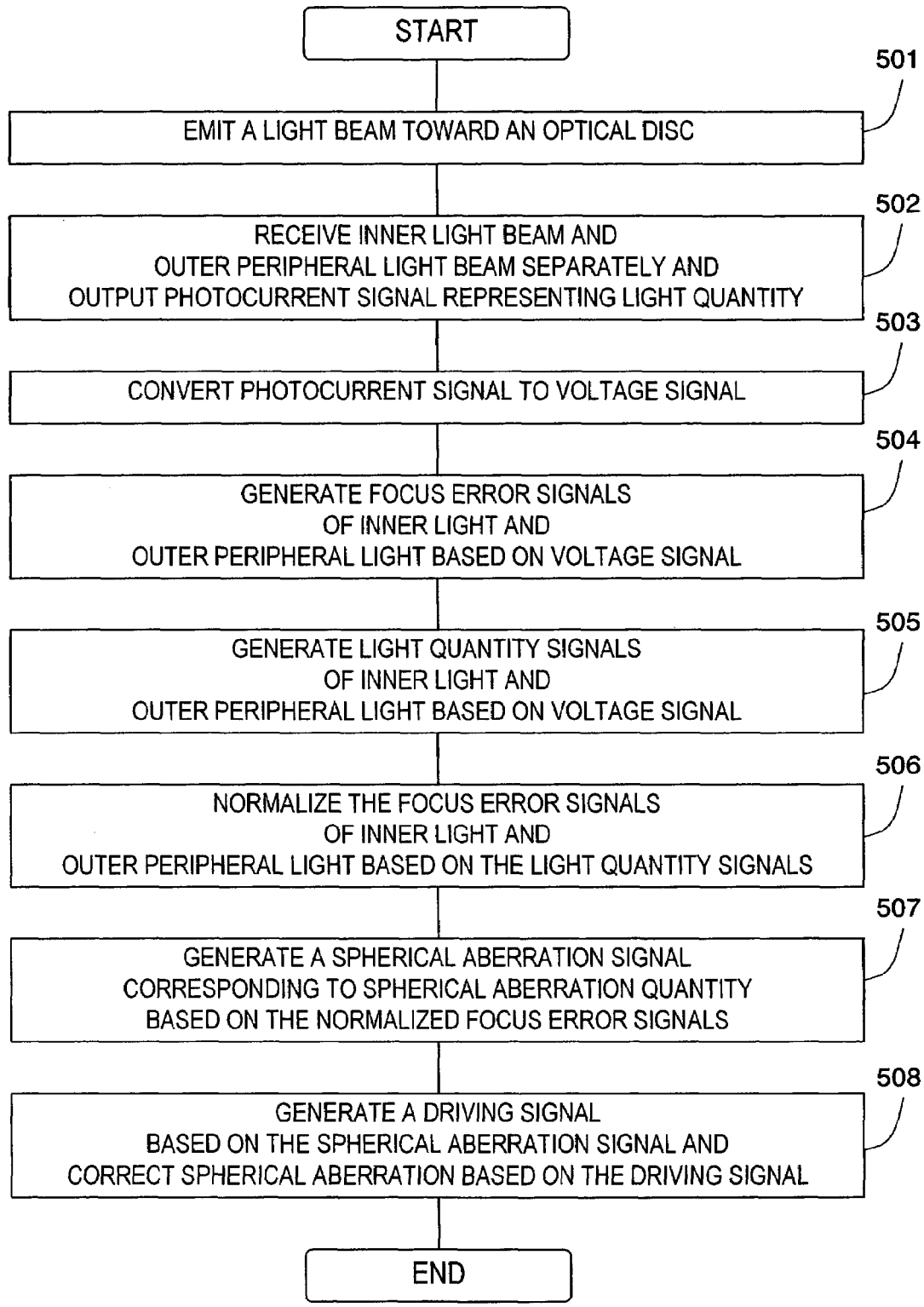

DIVISION RATIO 50%

OUTER FE SIGNAL

INNER FE SIGNAL

OUTER AS SIGNAL

INNER AS SIGNAL

OUTER NORMALIZED FE SIGNAL

INNER NORMALIZED FE SIGNAL

FE SIGNAL

SPHERICAL ABERRATION SIGNAL

FE SIGNAL

CHANGE IN THICKNESS OF OPTICAL DISC ON IRRADIATING POSITION

SPHERICAL ABERRATION SIGNAL (PRIOR ART)

SPHERICAL ABERRATION SIGNAL (PRESENT INVENTION)

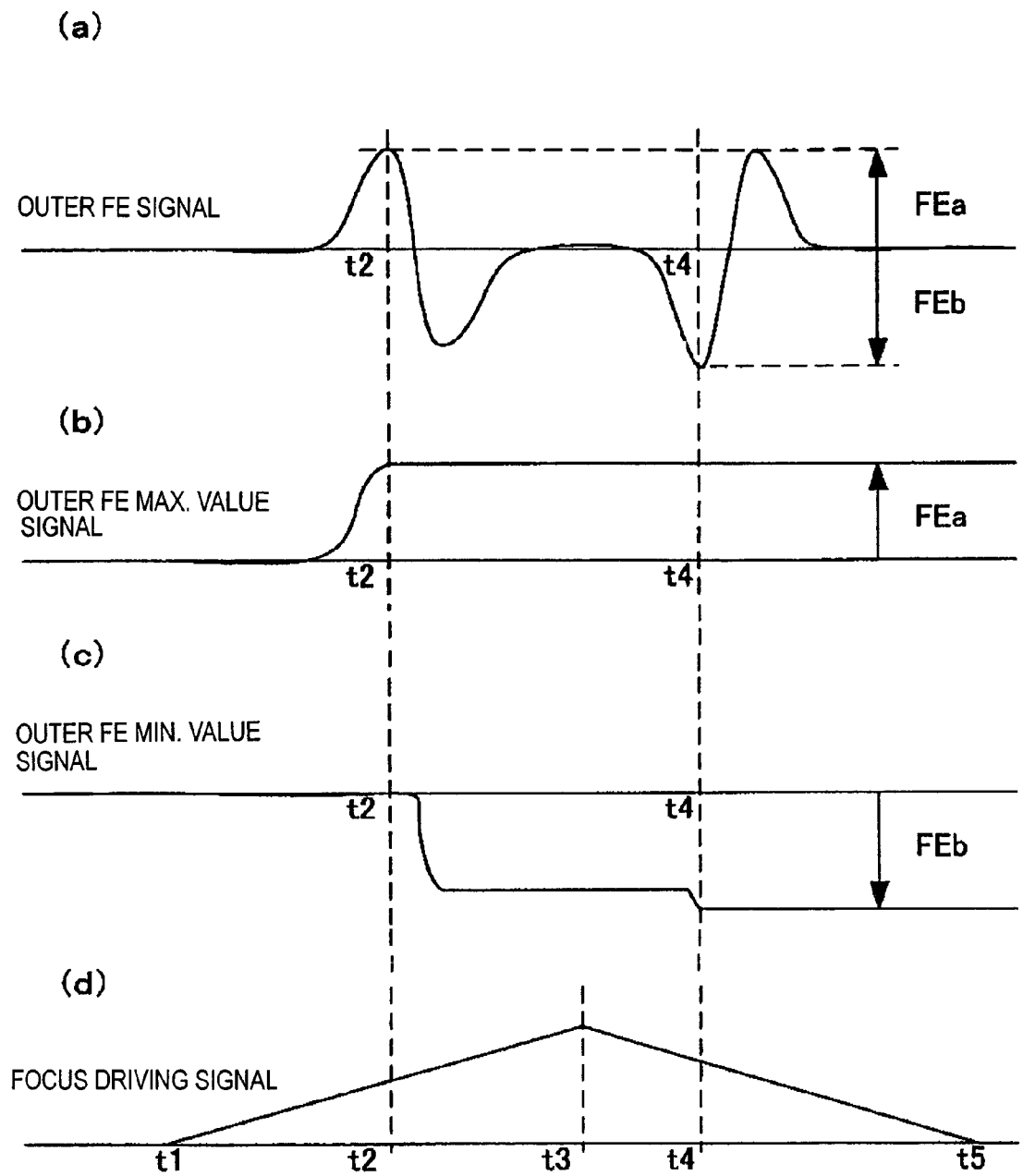

SPHERICAL ABERRATION SIGNAL

REFLECTED LIGHT QUANTITY SIGNAL

NORMALIZED SPHERICAL ABERRATION SIGNAL

DIVISION RATIO 50%

OUTER FE SIGNAL

INNER FE SIGNAL

FE SIGNAL

SPHERICAL ABERRATION SIGNAL

OUTER FE SIGNAL

INNER FE SIGNAL

FE SIGNAL

SPHERICAL ABERRATION SIGNAL

OPTICAL DISC DRIVE INCLUDING DETECTION AND CORRECTION OF SPHERICAL ABERRATION

BACKGROUND OF THE INVENTION

1. Field of the Invention

The present invention relates to an optical disc apparatus for use to read and/or write data from/on an optical disc using a light beam. More specifically, the present invention relates to an optical disc drive which can read and/or write data with high density by accurately detecting and correcting a spherical aberration caused by a change in the thickness of a protective layer of an optical disc particularly when a light beam is converged using a lens or the like with a large numerical aperture.

2. Description of the Related Art

Optical recording medium have been conventionally proposed as recording mediums for storing information such as video information, audio information, or programs and data for computers. The optical disc drive can read and/or write data from/on the optical recording medium by using optical system. For example, the following mediums are known: read-only/writable type optical discs represented by a CD (Compact Disc), a DVD (Digital Versatile Disc), and a BD (Blu-ray Disc), a PD (phase-change optical Disc), an MO (Magneto Optical) disc, and optical cards.

In the following explanation, an optical recording medium represents an optical disc. For example, as shown in FIG. 1, the optical disc has an information storage layer 29 for storing information. An optical disc drive writes data on the information storage layer 29 and read the data from the information storage layer 29 by using optical means. The information storage layer 29 is protected by a protective layer 25.

Initially, referring to FIG. 14, a configuration of a conventional optical disc drive will be discussed below. Such an optical disc drive is described in, for example, Japanese Patent Laid-Open Publication No. 2002-190125.

FIG. 14 shows the configuration of the functional block of a conventional optical disc drive 140. A disc motor 10 of the optical disc drive 140 rotates an optical disc 20 as an information carrier, with a predetermined number of revolutions. A light beam 30 emitted from a semiconductor laser light source 3 is converged to the information storage layer of the optical disc 20 by an objective lens 1. A focus actuator 2 moves the objective lens 1 in a substantially perpendicular direction (focusing direction) to an information storage layer 29 of the optical disc 20 so as to change the convergence position of the light beam. As a result, a beam spot is formed on a desired position of the information storage layer. The control of a convergence position by using the focus actuator 2 is called "focus control".

The light beam 30 reflected by the information storage layer 29 of the optical disc 20 passes through the objective lens 1 and is received by a photodetector 4, and the reflected light beam 30 is detected as photocurrent of a level corresponding to a quantity of received light. The objective lens 1 is adjusted in consideration of the influence caused by the thickness of the protective layer of the optical disc 20. To be specific, a correction quantity of spherical aberration is adjusted on the assumption that focus control is stably performed on the information storage layer 29 of the optical disc 20, thereby obtaining a high-quality information signal. The "spherical aberration" means a displacement between the focal position of light passing through the inside of the objective lens 1 and the focal position of light passing through the outside of the objective lens 106.

The following will describe the detail of the focus control and spherical aberration control which relates to the correction of a spherical aberration.

Referring to FIG. 15, the focus control will be firstly described below. Note that the following optical system constitutes a detection system which detects a focus error by a typical astigmatism method. FIG. 15 shows a detailed configuration of the photodetector 4 and a preamplifier 11. The photodetector 4 for detecting photocurrent includes an outer peripheral photodetector 40 and an inner photodetector 41, and each of the receiving parts has four light-receiving areas. The light-receiving areas A to D of the outer peripheral photodetector 40 receive light of the outer peripheral portion of the reflected light beam 30 (hereinafter, referred to as "outer peripheral light"). The light-receiving areas A to D of the inner photodetector 41 receive light of the inner portion of the reflected light beam 30 (hereinafter, referred to as "inner light"). Additionally, outer peripheral light and inner light can be obtained by providing, for example, a beam splitter 47, a light shielding plate 48 for shielding inner light, and a light shielding plate 49 for shielding outer peripheral light of FIG. 3.

Each of the light-receiving areas generates photocurrent of a level corresponding to a quantity of received light and outputs photocurrent to the preamplifier 11. The preamplifier 11 has I/V converters 42a to 42d and 43a to 43d which correspond to the light-receiving areas, respectively, and convert received photocurrent to voltage. Converted voltage signals are outputted to an outer peripheral FE generator 44 and an inner FE generator 45.

The outer peripheral FE generator 44 generates an error signal based on the output signal of the preamplifier 11 according to the astigmatism method. The error signal indicates an error between the beam spot of outer peripheral light and the perpendicular direction of the optical disc 20. The error signal indicates a focus error of outer peripheral light and will be referred to as an "outer peripheral FE signal". On the other hand, the inner FE generator 45 generates an error signal based on the output signal of the preamplifier 11 according to the astigmatism method. The error signal indicates an error between the beam spot of inner light and the perpendicular direction of the optical disc 20. The error signal indicates a focus error of inner light and will be referred to as an "inner FE signal".

A focus error generator 7 sums the output signals of the outer peripheral FE generator 44 and the inner FE generator 45 and generates an error signal indicating an error between the perpendicular direction of the optical disc 20 and a beam spot generated by all the light beams outputted from the light source 3. The error signal is referred to as a so-called focus error signal and will be referred to an "FE signal" below. Although the generating method of the FE signal is somewhat different from that of the FE signal generated by the astigmatism method, the characteristics are the same.

The FE signal serving as an output signal of the focus error generator 7 is outputted to a focus actuator driver 9 after filter computing such as phase compensation and gain compensation is performed in a focus controller 17. The focus actuator driver 9 receives the signal processed by the focus controller 17 to generate a drive signal.

The objective lens 1 is driven by the focus actuator 2 which operates based on the drive signal from the focus actuator driver 9. A state of a beam spot is controlled so as to have a predetermined converging state on the information storage layer 209 of the optical disc 20, which realizes focus control.

Referring to FIGS. 16A and 16B, spherical aberration will be described below. FIG. 16A shows that no spherical aberration is produced at the information storage layer 29. FIG. 16B shows that spherical aberration is produced at the information storage layer 29.

In the state of FIG. 16A, a thickness DA from the surface of the optical disc 20 to the information storage layer is optimum relative to the light beam 30. In a state in which focus control is performed, a light beam emitted from the light source 3 is refracted on the protective layer 25 of the optical disc 20. The light beam on the outer periphery (outer peripheral light beam) 30-1 is collected on point C, and a light beam on the inner periphery (inner light beam) 30-2 is collected on point B. Position A is defined on a straight line passing through focus B and focus C and on the information storage layer 29. Since no spherical aberration is produced at the information storage layer 29 of the optical disc 20, the focus C of the outer peripheral light beam 30-1 and the focus B of the inner light beam 30-2 both coincide with the position A. Namely, an equidistant surface from the position A and the wave front of the light beam coincide with each other.

Meanwhile, in the state of FIG. 16B, a thickness (a thickness of the protective layer 25) DB from the surface of the disc to the information storage layer is smaller than the thickness DA of the protective layer 25. As a result, the focus C of the outer peripheral light beam 30-1 and the focus B of the inner light beam 30-2 are separated from each other, and the two focuses enter a defocusing state relative to the position A of the information storage layer 29 where the light beam 30 should be entirely converged. Namely, spherical aberration is produced. Then, as a thickness DB of the protective layer 25 decreases, the influence on the spherical aberration increases. In FIG. 16B, solid lines indicate the outer peripheral light beam 30-1 and the inner light beam 30-2 when spherical aberration is produced, and broken lines indicate the outer peripheral light beam and the inner light beam when no spherical aberration is produced.

However, even when spherical aberration is produced, focus control is performed so that an FE signal outputted from the focus error generator 7 becomes substantially 0. Thus, it can be said that the focal position A of the light beam 30 coincides with the information storage layer 29. Unlike FIG. 16A, the wave front of the light beam does not coincide with the equidistant surface from the position A.

The focus B and the focus C are separated from each other also when the protective layer 25 has a larger thickness than the thickness DA of the protective layer shown in FIG. 16A. The two focuses enter a defocusing state relative to the position A of the information storage layer 29. Thus, spherical aberration is produced.

Referring to FIG. 14 again, the following will describe spherical aberration control for correcting spherical aberration. The outer peripheral FE generator 44 and the inner FE generator 45 output an-outer peripheral FE signal and an inner FE signal including an influence quantity of spherical aberration on an outer peripheral light beam (a defocusing quantity of the focus C) and an influence quantity of spherical aberration on an inner light beam (a defocusing quantity of the focus B), respectively. A spherical aberration detector 31 calculates a difference between the outer peripheral FE signal and the inner FE signal by arithmetic and generates a signal corresponding to a quantity of spherical aberration produced at the convergence position A (hereinafter, referred to as a "spherical aberration signal").

A spherical aberration controller 35 compensates the phase of the spherical aberration signal and performs filter computing such as gain compensation. Thereafter, the spherical aberration controller 35 outputs the processed spherical aberration signal to a beam expander driver 33. The beam expander driver 33 generates a drive signal based on the spherical aberration signal and impresses the drive signal to a correction actuator 34. The spherical aberration correction actuator 34 changes an interval between spherical aberration correction lenses 15 based on the drive signal and sets a spherical aberration substantially at 0. As a result, the focus C of the outer peripheral light beam and the focus B of the inner light beam coincide with the position A. In this manner, spherical aberration control is performed.

Referring to FIGS. 17A to 17E and FIGS. 18A to 18E, the following will describe the influence of the FE signal, which is obtained in the defocusing state, on the spherical aberration signal. In the following explanation, spherical aberration control is not performed.

FIG. 17A shows a cross sectional view of a light beam divided into the outer peripheral light beam 30-1 and the inner light beam 30-2 at the position of a 50% radius from the center of a received light beam. FIG. 17B shows the waveform of the outer peripheral FE signal. Similarly, FIG. 17C indicates the waveform of the inner FE signal, FIG. 17D shows the waveform of the FE signal, and FIG. 17E shows the waveform of the spherical aberration signal. In the graphs of FIGS. 17B to 17E, the vertical axes indicate the voltage levels of the signals, and the horizontal axes indicate defocusing quantities. As described above, regarding the outer peripheral FE signal of FIG. 17B and the inner FE signal of FIG. 17C, when addition is performed, the FE signal of FIG. 17D is obtained. When subtraction is performed, the spherical aberration signal of FIG. 17E is obtained.

When the outer peripheral light beam 30-1 and the inner light beam 30-2 are divided as shown in FIG. 17A, the outer periphery is larger in light quantity than the inner periphery. Thus, the outer peripheral FE signal of FIG. 17B is larger in amplitude than the inner FE signal of FIG. 17C. As a result, even though a spherical aberration remains constant, as shown in FIG. 17E, the level of spherical aberration signal changes according to a defocusing quantity. Besides, as is understood from FIGS. 17D and 17E, the polarity of the spherical aberration signal is the same as that of the FE signal. The spherical aberration signal is delayed by 0 degree from the phase of the FE signal.

Meanwhile, FIG. 18A indicates a cross sectional view of a light beam divided into the outer peripheral light beam 30-1 and the inner light beam 30-2 at the position of a 75% radius from the center of a received light beam. FIG. 18B indicates the waveform of the outer peripheral FE signal. Similarly, FIG. 18C indicates the waveform of the inner FE signal, FIG. 18D shows the waveform of the FE signal, and FIG. 18E shows the waveform of the spherical aberration signal. In FIGS. 18B to 18E, the vertical axes indicate voltage levels, and the horizontal axes indicate defocusing quantities.

When the outer peripheral light beam 30-1 and the inner light beam 30-2 are divided as shown in FIG. 18A, the inner periphery is larger in light quantity than the outer periphery. Thus, the inner FE signal of FIG. 17C is larger in amplitude than the outer peripheral FE signal of FIG. 17B. As a result, even though a spherical aberration remains constant, as shown in FIG. 18E, the level of spherical aberration signal changes according to a defocusing quantity. Besides, as is understood from FIGS. 18D and 18E, the spherical aberration signal is opposite in polarity to the FE signal. The spherical aberration signal is delayed by 180 degrees from the phase of the FE signal.

In the beam spot, a spherical aberration is produced according to a thickness of the protective layer 25 in proportion to the fourth power of the numerical aperture (hereinafter, referred to as "NA") of the objective lens 1. In the case of a conventional optical disc (DVD, etc.) allowing an NA of about 0.6, a spherical aberration caused by an uneven thickness of the protective layer 25 is negligible within a permissible range.

However, for example, in the case of an optical disc such as a BD requiring the light source 3 having an NA of 0.85 and a wavelength of 405 nm, in order to obtain a high-quality information signal, the aberration of a light source, particularly a spherical aberration caused by the objective lens 1 and the protective layer 25 of the optical disc, may not be negligible.

Although a method using the spherical aberration signal to correct a spherical aberration has been considered, a spherical aberration caused by an uneven thickness of the protective layer 25 may not be accurately corrected, since the spherical aberration signal includes an error in the defocusing state.

SUMMARY OF THE INVENTION

It is an object of the present invention to generate a spherical aberration signal which does not include an error even in the defocusing state, positively correct a spherical aberration by using the spherical aberration signal, and stably read and/or write data even when the protective layer 25 of the optical disc has an uneven thickness.

An optical disc drive according to a preferred embodiment of the present invention reads data from an optical disc and/or writes data on an optical disc having an information storage layer. The optical disc drive preferably includes a light source, a collector optics, a light-receiving section, a first and a second focus signal generating sections, a first and a second light quantity generating sections, a first and a second normalizing sections and a detecting section. The collector optics focuses light from the light source. The light-receiving section receives a peripheral part of the light reflected by the information storage layer to generate a first detection signal and receives a non-peripheral part of the light to generate a second detection signal. The first focus signal generating section generates a first focus signal based on the first detection signal according to a focusing state of the light in the peripheral part. The second focus signal generating section generates a second focus signal based on the second detection signal according to a focusing state of the light in the non-peripheral part. The first light quantity generating section generates a first light quantity signal based on the first detection signal according to a light quantity of the peripheral part. The second light quantity generating section generates a second light quantity signal based on the second detection signal according to a light quantity of the non-peripheral part. The first normalizing section generates a first normalized signal by normalizing the first focus signal based on the first light quantity signal. The second normalizing section generates a second normalized signal by normalizing the second focus signal based on the second light quantity signal. The detecting section generates a spherical aberration signal based on the first normalized signal and the second normalized signal according to a quantity of spherical aberration produced at a focusing position of the light.

In one preferred embodiment of the present invention, the optical disc drive may include a third focus signal generating section for calculating a sum of the first focus signal and the second focus signal to generate a third focus signal indicating a focusing state of the light.

In still another preferred embodiment of the present invention, the detecting section may calculate a difference between the first normalized signal and the second normalized signal to generate the spherical aberration signal.

In yet another preferred embodiment of the present invention, the optical disc drive may include a driver for generating a drive signal according to the spherical aberration signal and a correcting section for changing optical characteristics of a path of the light according to the drive signal and for correcting the spherical aberration produced at the focusing position of the light.

In still another preferred embodiment of the present invention, the correcting section may correct a spherical aberration substantially to 0 according to the drive signal.

In yet another preferred embodiment of the present invention, the optical disc drive may include a focus control section for generating a position changing signal according to the third focus signal and include a position changing section for changing a position of the collector optics perpendicularly to the information storage layer according to the position changing signal and changing the focusing position of the light.

In one preferred embodiment of the present invention, the first normalizing section may generate values of the first normalized signal by dividing values of the first focus signal by values of the first light quantity signal, and the second normalizing section may generate signal values of the second normalized signal by dividing values of the second focus signal by values of the second light quantity signal.

An optical disc drive according to a preferred embodiment of the present invention reads data from an optical disc and/or writes data on an optical disc having an information storage layer. The optical disc drive preferably includes a light source, a collector optics, a light-receiving section, a first and a second focus signal generating sections, a first and a second measuring sections, a first and a second normalizing sections, and a detecting section. The collector optics focuses light from the light source. The light-receiving section receives a peripheral part of the light reflected by the information storage layer to generate a first detection signal and receives a non-peripheral part of the light to generate a second detection signal. The first focus signal generating section generates a first focus signal based on the first detection signal according to a focusing state of the light in the peripheral part. The second focus signal generating section generates a second focus signal based on the second detection signal according to a focusing state of the light in the non-peripheral part. The first measuring section measures amplitude of the first focus signal to generate a first amplitude signal. The second measuring section measures amplitude of the second focus signal to generate a second amplitude signal. The first normalizing section generates a first normalized signal by normalizing the first focus signal based on the first amplitude signal. The second normalizing section generates a second normalized signal by normalizing the second focus signal based on the second amplitude signal. The detecting section generates a spherical aberration signal based on the first normalized signal and the second normalized signal according to a quantity of spherical aberration produced at a focusing position of the light.

In one preferred embodiment of the present invention, the optical disc drive may include a driver for generating a drive signal according to the spherical aberration signal; and a correcting section for changing optical characteristics of a path of the light according to the drive signal and for correcting the spherical aberration produced at the focusing position of the light.

In one preferred embodiment of the present invention, the correcting section corrects a spherical aberration substantially to 0 according to the drive signal.

In still another preferred embodiment of the present invention, the optical disc drive may include a position changing section for changing a position of the collector optics perpendicularly to the information storage layer and for changing the focusing position of the light. When the position changing section changes the position of the collector optics perpendicularly to the information storage layer, the first measuring section may detect a maximum level and a minimum level of the first focus signal and may measure a difference between the maximum level and the minimum level as amplitude of the first focus signal. The second measuring section may detect a maximum level and a minimum level of the second focus signal and may measure a difference between the maximum level and the minimum level as amplitude of the second focus signal.

An optical disc drive according to a preferred embodiment of the present invention reads data from an optical disc and/or writes data on an optical disc having an information storage layer. The optical disc drive preferably includes a light source, a collector optics, a light-receiving section, a spherical aberration detecting section, a light quantity detecting section, and a normalized aberration detecting section. The collector optics focuses light from the light source. The light-receiving section receives the light reflected by the information storage layer to generate a detection signal. The spherical aberration detecting section generates a spherical aberration signal based on the detection signal according to a quantity of spherical aberration produced at a focusing position of the light. The light quantity detecting section generates a light quantity signal based on the detection signal according to a quantity of the light. The normalized aberration detecting section normalizes the spherical aberration signal based on the light quantity signal to generate a normalized spherical aberration signal.

In one preferred embodiment of the present invention, the light-receiving section may have light-receiving elements including a first light-receiving element and a second light-receiving element. In receipt of the light, the first light-receiving element receives a peripheral part of the light reflected by the information storage layer and the second light-receiving element receives a non-peripheral part of the light. As a result of the reception, at least one of a first detection signal generated in the first light-receiving element and a second detection signal generated in the second light-receiving element is outputted to the light quantity detecting section.

In still another preferred embodiment of the present invention, the light-receiving section further may include a third light-receiving element for receiving an entire light to generate a third detection signal. The light-receiving section outputs at least one of a first detection signal generated in the first light-receiving element and a second detection signal generated in the second light-receiving element and the third detection signal to the light quantity detecting section.

In yet another preferred embodiment of the present invention, each of the light-receiving elements may generate a detection signal having a signal level according to received light quantity. The light-receiving section outputs one of the detection signals having a maximum signal level to the light quantity detecting section.

A method according to a preferred embodiment of the present invention is used for reading data from an optical disc and/or writing data on an optical disc having an information storage layer. The method includes steps of: focusing light from a light source; receiving a peripheral part of the light reflected by the information storage layer to generate a first detection signal; receiving a non-peripheral part of the light to generate a second detection signal; generating a first focus signal based on the first detection signal according to a focusing state of the light in the peripheral part; generating a second focus signal based on the second detection signal according to a focusing state of the light in the non-peripheral part; generating a first light quantity signal based on the first detection signal according to a light quantity of the peripheral part; generating a second light quantity signal based on the second detection signal according to a light quantity of the non-peripheral part; generating a first normalized signal by normalizing the first focus signal based on the first light quantity signal; generating a second normalized signal by normalizing the second focus signal based on the second light quantity signal; and generating a spherical aberration signal based on the first normalized signal and the second normalized signal according to a quantity of spherical aberration produced at a focusing position of the light.

A data writing method according to a preferred embodiment of the present invention is used for reading data from an optical disc and/or writing data on an optical disc having an information storage layer. The method preferably includes steps of: focusing light from a light source; receiving a peripheral part of the light reflected by the information storage layer to generate a first detection signal; receiving a non-peripheral part of the light to generate a second detection signal; generating a first focus signal based on the first detection signal according to a focusing state of the light in the peripheral part; generating a second focus signal based on the second detection signal according to a focusing state of the light in the non-peripheral part; measuring amplitude of the first focus signal to generate a first amplitude signal; measuring amplitude of the second focus signal to generate a second amplitude signal; generating a first normalized signal by normalizing the first focus signal based on the first amplitude signal; generating a second normalized signal by normalizing the second focus signal based on the second amplitude signal; and generating a spherical aberration signal based on the first normalized signal and the second normalized signal according to a quantity of spherical aberration produced at a focusing position of the light.

A data writing method according to a preferred embodiment of the present invention is used for reading data from an optical disc and/or writing data on an optical disc having an information storage layer. The method preferably includes steps of: focusing light from a light source; receiving the light reflected by the information storage layer to generate a detection signal; generating a spherical aberration signal based on the detection signal according to a quantity of spherical aberration produced at a focusing position of the light; generating a light quantity signal based on the detection signal according to a quantity of the light; and normalizing the spherical aberration signal based on the light quantity signal to generate a normalized spherical aberration signal.

A computer program product according to a preferred embodiment of the present invention is preferably used with an optical disc drive to read data from an optical disc and/or to write data on an optical disc having an information storage layer. The computer program product causes the optical disc drive to perform steps of: focusing light from a light source of the optical disc; receiving a peripheral part of the light reflected by the information storage layer to generate a first detection signal; receiving a non-peripheral part of the light to generate a second detection signal; generating a first focus signal based on the first detection signal according to a focusing state of the light in the peripheral part; generating a second focus signal based on the second detection signal according to a focusing state of the light in the non-peripheral part; generating a first light quantity signal based on the first detection signal according to a light quantity of the peripheral part; generating a second light quantity signal based on the second detection signal according to a light quantity of the non-peripheral part; generating a first normalized signal by normalizing the first focus signal based on the first light quantity signal; generating a second normalized signal by normalizing the second focus signal based on the second light quantity signal: and generating a spherical aberration signal based on the first normalized signal and the second normalized signal according to a quantity of spherical aberration produced at a focusing position of the light.

A controller circuit according to a preferred embodiment of the present invention is used for controlling operations of an optical disc drive, having a light source and a light-receiving section, to read data from an optical disc and/or to write data having an information storage layer. The controller circuit preferably includes a microcomputer, a first and a second focus signal generating sections, a first and a second light quantity generating sections, a first and a second normalizing sections, and a detecting section. The microcomputer causes the light source to emit light and causes the light-receiving section to receive a peripheral part and a non-peripheral part of the light reflected by the information storage layer to generate a first detection signal from the peripheral part and a second detection signal from the non-peripheral part. The first focus signal generating section generates a first focus signal based on the first detection signal according to a focusing state of the light in the peripheral part. The second focus signal generating section generates a second focus signal based on the second detection signal according to a focusing state of the light in the non-peripheral part. The first light quantity generating section generates a first light quantity signal based on the first detection signal according to a light quantity of the peripheral part. The second light quantity generating section generates a second light quantity signal based on the second detection signal according to a light quantity of the non-peripheral part. The first normalizing section generates a first normalized signal by normalizing the first focus signal based on the first light quantity signal. The second normalizing section generates a second normalized signal by normalizing the second focus signal based on the second light quantity signal. The detecting section generates a spherical aberration signal based on the first normalized signal and the second normalized signal according to a quantity of spherical aberration produced at a focusing position of the light.

BRIEF DESCRIPTION OF THE DRAWINGS

FIG. 5 is a flowchart showing the processing steps of the optical disc drive 100.

Portion (a) of FIG. 10 is a waveform chart showing an outer peripheral FE signal.

Portion (b) of FIG. 10 is a waveform chart showing an outer peripheral FE maximum value signal generated based on the outer peripheral FE signal of portion (a).

Portion (c) of FIG. 10 is a waveform chart showing an outer peripheral FE minimum value signal generated based on the outer peripheral FE signal of portion (a).

Portion (d) of FIG. 10 is a waveform chart showing a focus drive signal.

Figure 11:
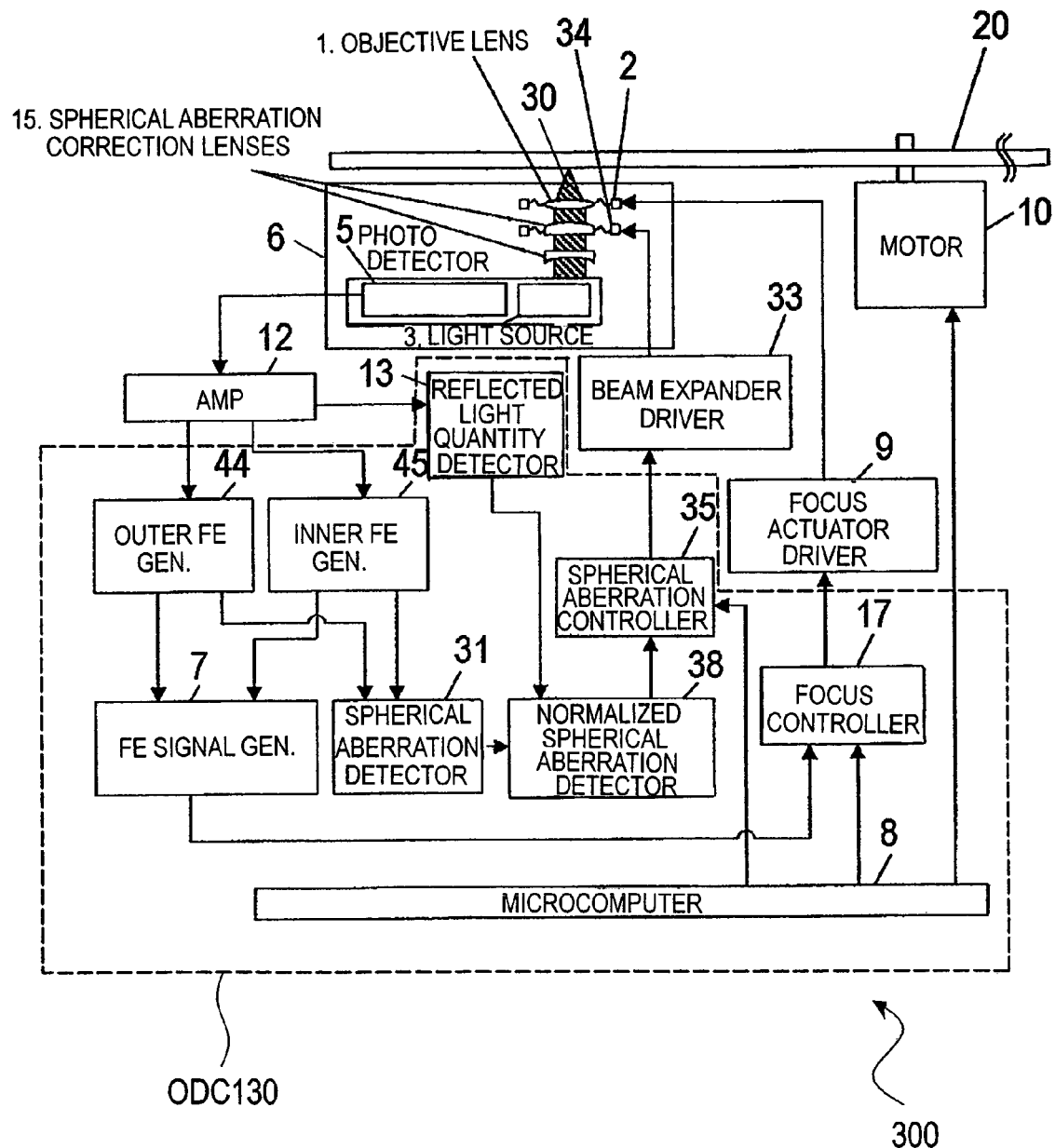

FIG. 11 is a block diagram showing an optical disc drive 300 of Embodiment 3.

Figure 12:
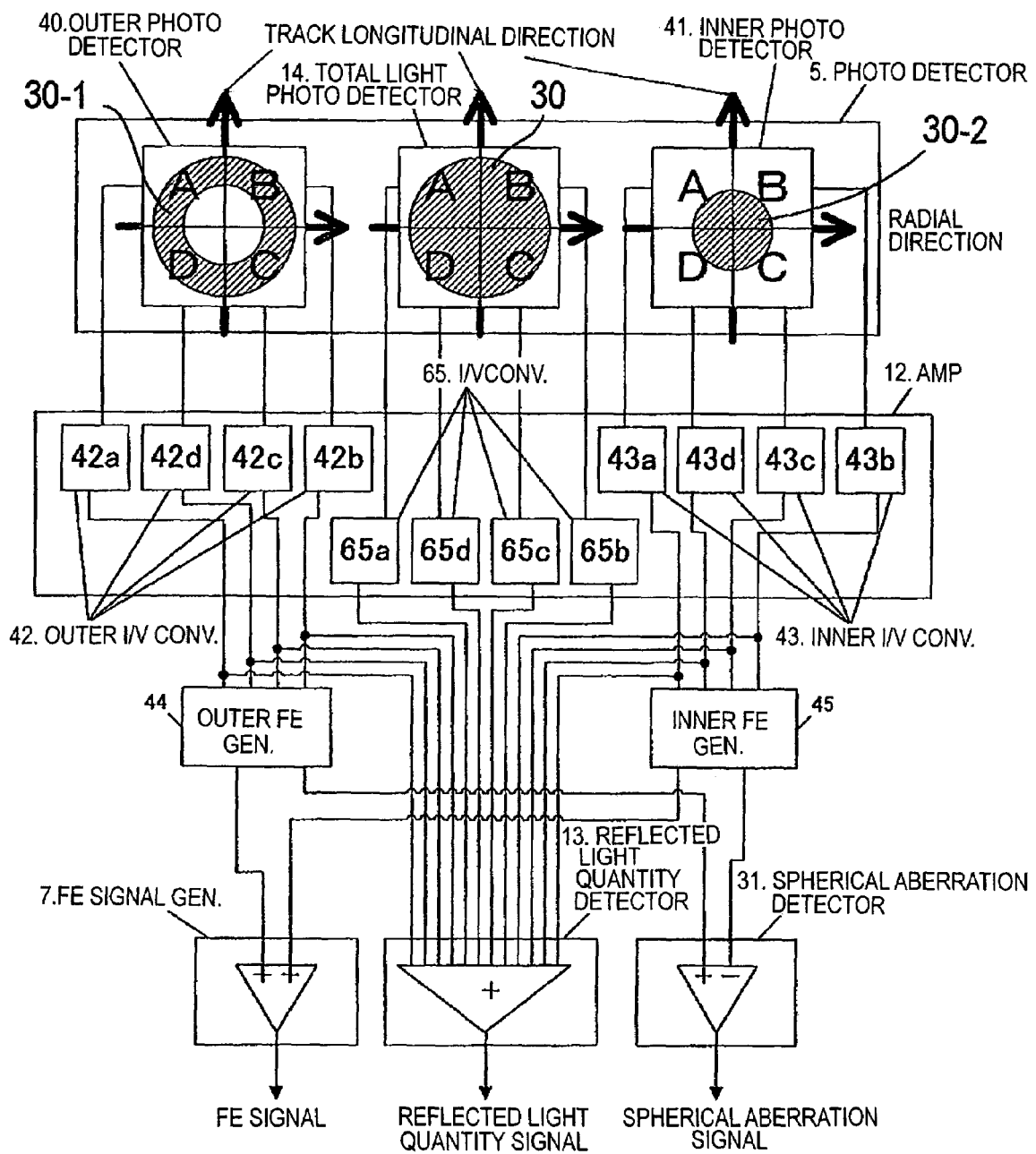

FIG. 12 is a connection diagram showing the elements of a photodetector 5, a preamplifier 12, and an optical disc controller 130.

Figure 13A:
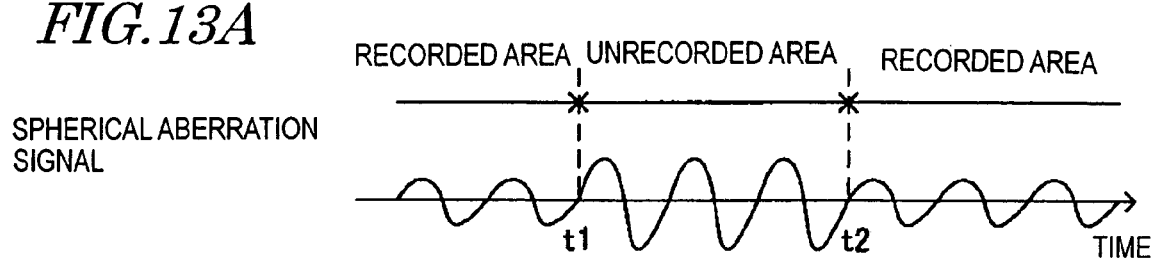

FIG. 13A is a waveform chart showing a spherical aberration signal.

Figure 13B:
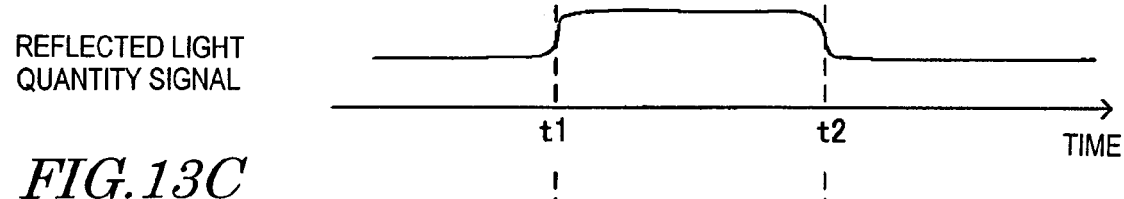

FIG. 13B is a waveform chart showing a reflected light quantity signal.

Figure 13C:
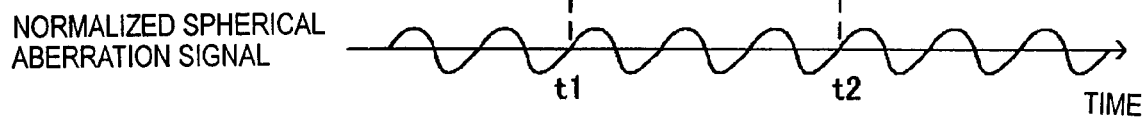

FIG. 13C is a waveform chart showing a normalized spherical aberration signal.

Figure 14:
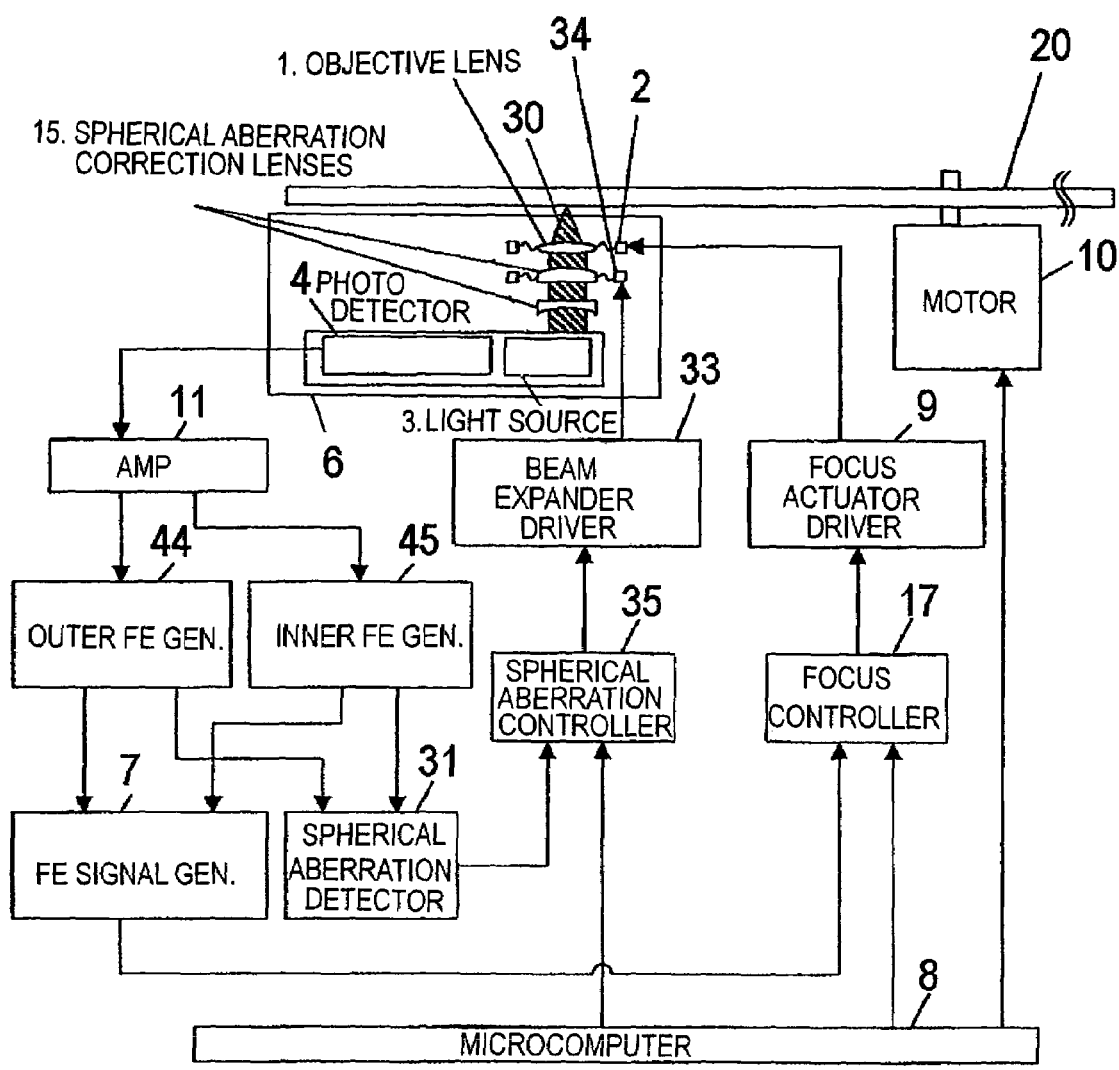

FIG. 14 is a block diagram showing a conventional optical disc drive 140.

Figure 15:
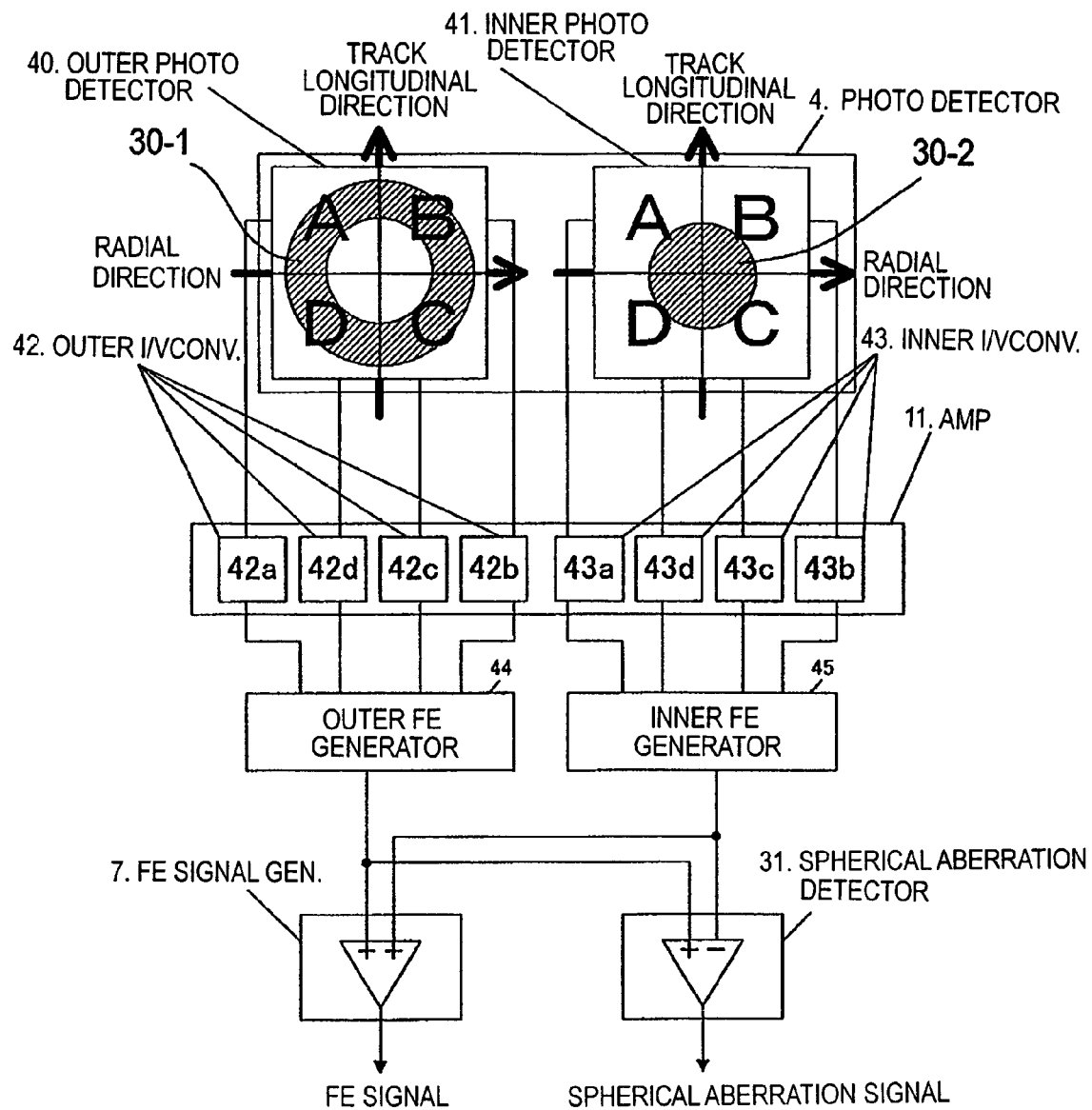

FIG. 15 is a connection diagram showing the photodetector 4 and the periphery of the preamplifier 11.

Figure 16A:
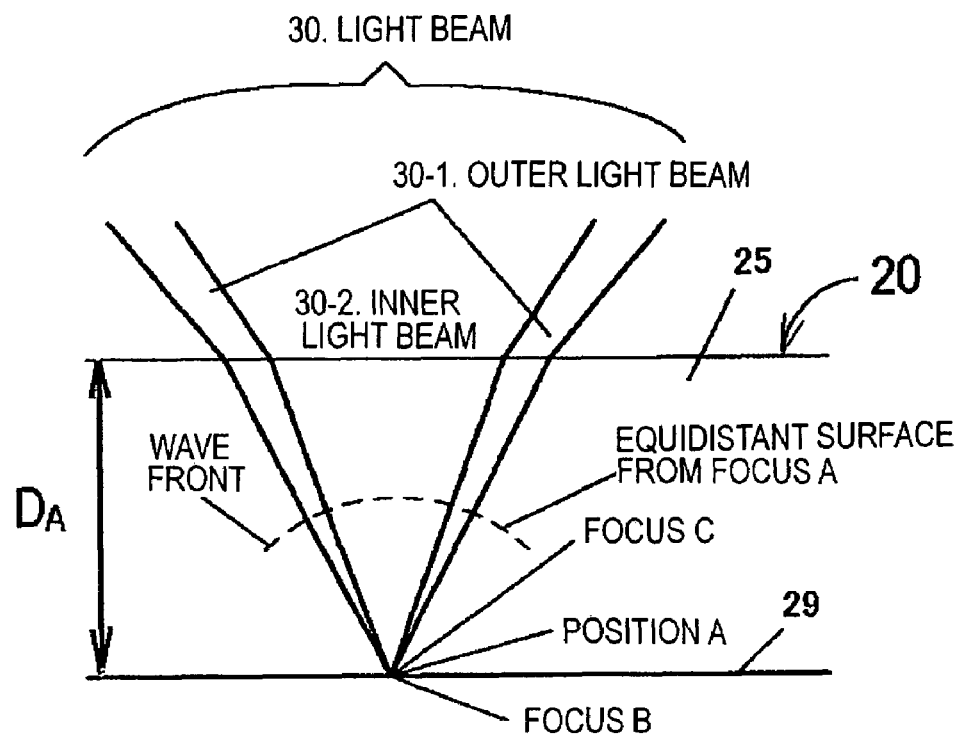

FIG. 16A shows that no spherical aberration is produced at an information storage layer 29.

Figure 16B:
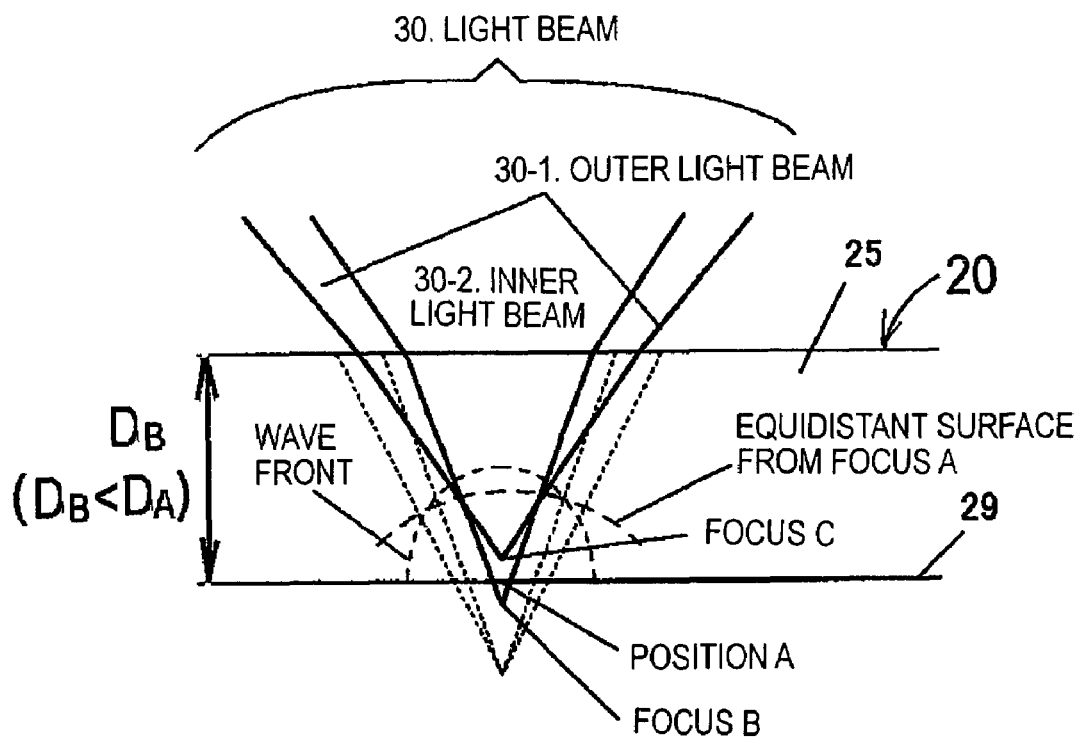

FIG. 16B shows that spherical aberration is produced at the information storage layer 29.

Figure 17A:
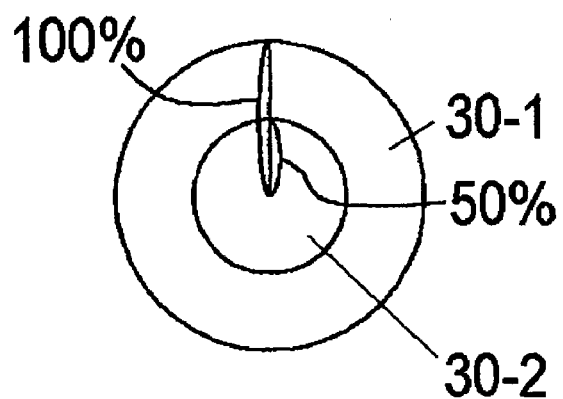

FIG. 17A shows a light beam divided into an outer peripheral light beam 30-1 and an inner light beam 30-2 at the position of a 50% radius from the center of a received light beam.

Figure 17B:
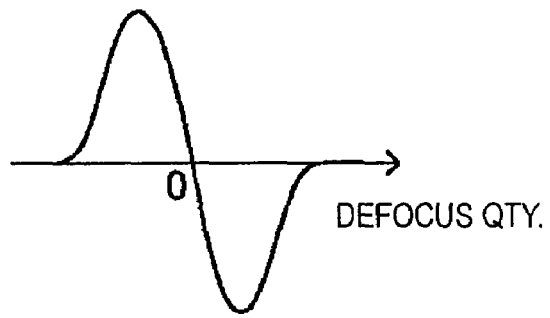

FIG. 17B is a waveform chart showing an outer peripheral FE signal.

Figure 17C:
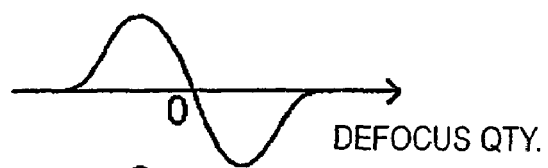

FIG. 17C is a waveform chart showing an inner FE signal.

Figure 17D:
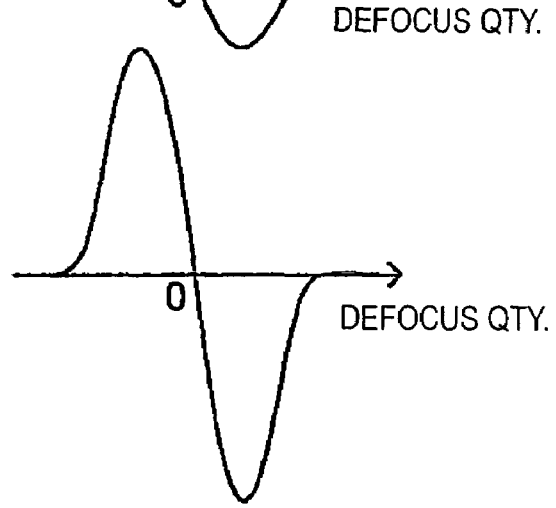

FIG. 17D is a waveform chart showing an FE signal.

Figure 17E:
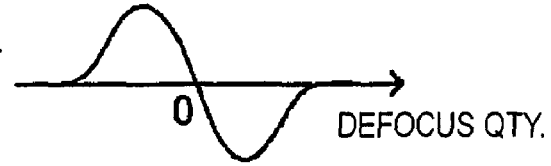

FIG. 17E is a waveform chart showing a spherical aberration signal.

Figure 18A:
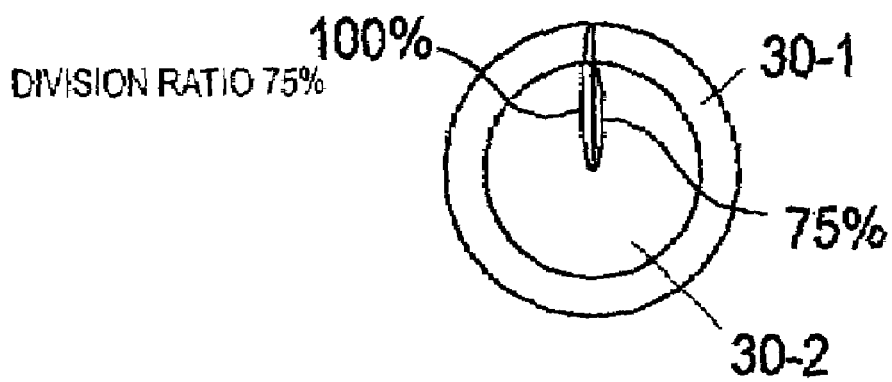

FIG. 18A shows a light beam divided into an outer peripheral light beam 30-1 and an inner light beam 30-2 at the position of a 75% radius from the center of a received light beam.

Figure 18B:

FIG. 18B is a waveform chart showing an outer peripheral FE signal.

Figure 18C:

FIG. 18C is a waveform chart showing an inner FE signal.

Figure 18D:
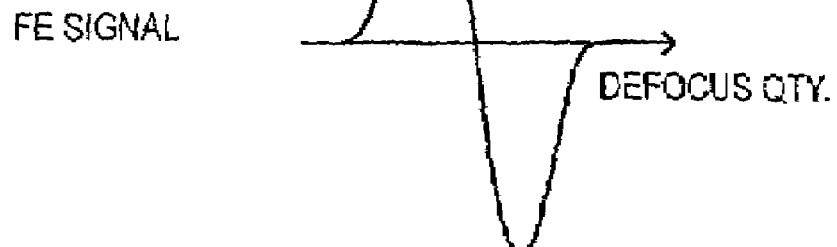

FIG. 18D is a waveform chart showing an FE signal.

Figure 18E:

FIG. 18E is a waveform chart showing a spherical aberration signal.

DETAILED DESCRIPTION OF PREFERRED EMBODIMENTS

Embodiments of an optical disc apparatus according to the present invention will be described below with reference to the accompanying drawings.

The optical disc apparatus according to the present invention reads and/or writes data from/on the optical disc. The apparatus is, for example, an optical disc drive, which is explained below.

Figure 1:
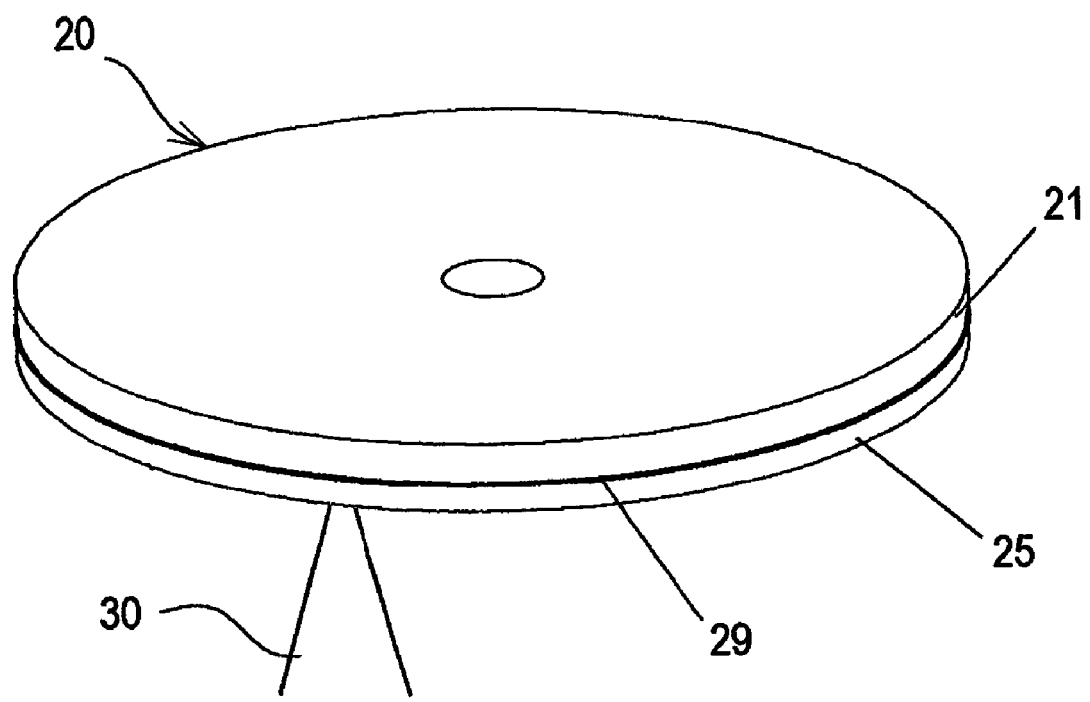
FIG. 1 is an outside drawing showing the structure of an optical disc 20.

Prior to explanation on the optical disc drive, an optical disc will be discussed. FIG. 1 shows structure of an optical disc 20. The optical disc 20 is, for example, a writable Blu-ray disc (BD) and has a base material 21, a protective layer 25, and an information storage layer 29. In the optical disc 20, the protective layer 25, the information storage layer 29, and the base material 21 are laminated in this order from the emitting side of a light beam 30. The base material 21 is a base with a thickness of about 1 mm and supports the information storage layer 29. The information storage layer 29 is used to store information. A phase-change material is formed thereon. The protective layer 25 is a transparent medium with a thickness of about 0.1 mm that allows the passage of the light beam 30 while protecting the information storage layer 29 from blemishes and contaminations. For reference, FIG. 1 shows the light beam 30 emitted to the optical disc 20.

Embodiment 1

The following will describe a first Embodiment of an optical disc drive according to the present invention.

Figure 2:
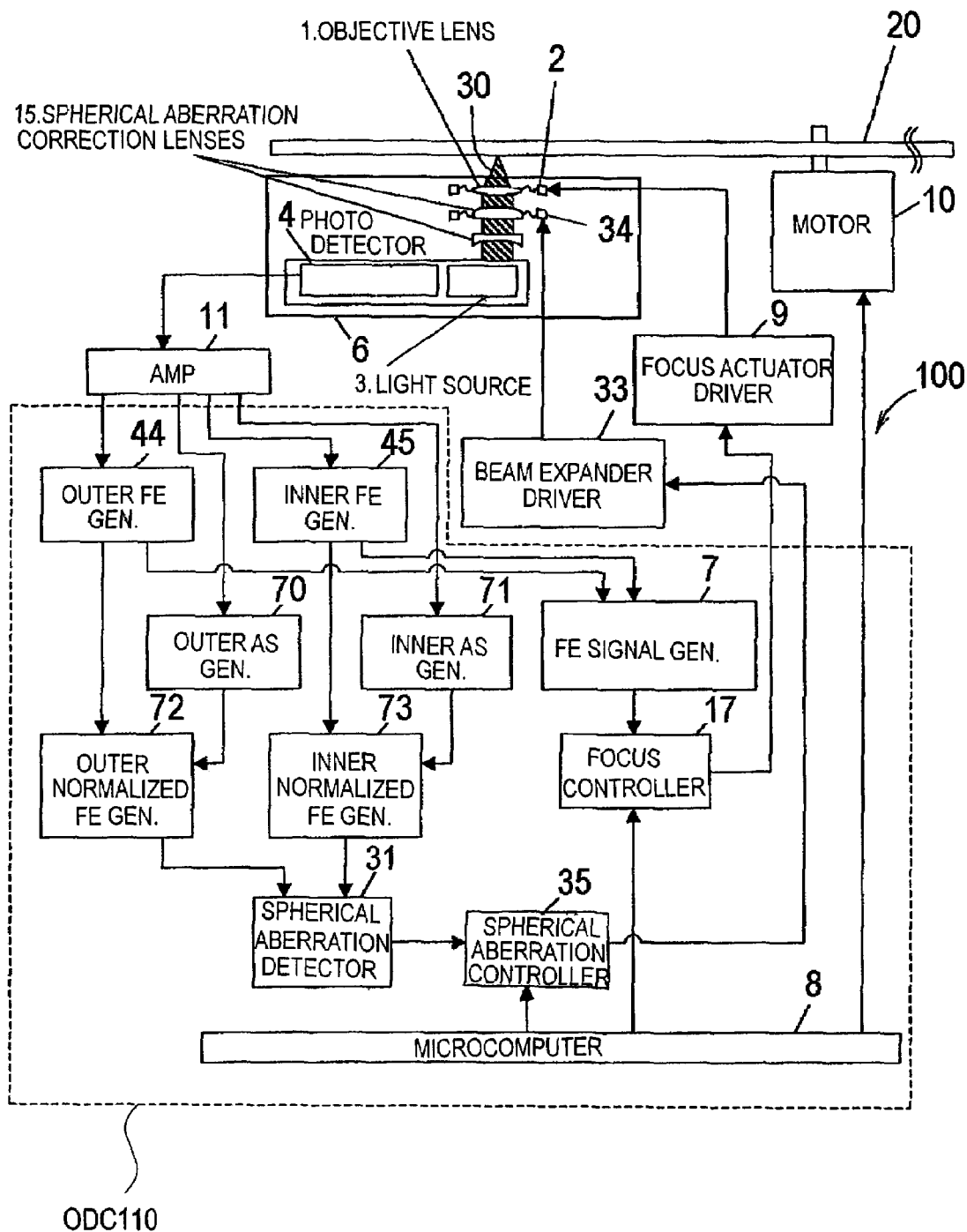
FIG. 2 is a block diagram showing an optical disc 100 according to Embodiment 1.

FIG. 2 shows configuration of the functional block of an optical disc drive 100 according to the present embodiment. An optical disc 20 is not an element but is shown in FIG. 2 for convenience of explanation.

The optical disc drive 100 read and/or write data from/on the optical disc 20. The optical disc drive 100 includes an optical head 6, drivers 9 and 33, a disc motor 10, a preamplifier 11, and an optical disc controller (ODC) 110.

Note that ODC 110 may include a plurality of controllers, which are implemented as a plurality of digital signal processors (DSPs) or as a plurality of functions of one or more DSPs.

The optical head 6 includes lenses (1, 15), actuators (2, 34), a light source 3 and a photodetector 4.

The lenses include an objective lens 1 and two spherical aberration correction lenses 15. The objective lens 1 focuses a light beam emitted from a light source 3, which will be described later. The spherical aberration correction lenses 15 are moved by the actuator 34, so that a spherical aberration produced at a beam spot is adjusted. Besides, the spherical aberration correction lenses 15 are used as one of means for correcting a spherical aberration produced at a beam spot on the information storage layer of the optical disc 20, and the means is not limited to a lens. Additionally, for example, an index of refraction may be changed by using a liquid crystal element so as to correct a spherical aberration.

The actuators include a focus actuator 2 and a spherical aberration correction actuator 34. The focus actuator 2 moves the objective lens 1 in a substantially perpendicular direction (focusing direction) to the information storage layer 29 of the optical disc 20 to change the convergence position of a light beam. Meanwhile, the spherical aberration correction actuator 34 (hereinafter, referred to as a "correction actuator 34") adjusts a spherical aberration of a light beam by changing an interval between the two spherical aberration correction lenses 15.

The light source 3 emits, for example, a blue laser beam (hereinafter, referred to as "light beam") with a wavelength of 405 nm. The photodetector 4 divides a reflected light beam 30 into a peripheral part (hereinafter, referred to as an "outer periphery") and a non-peripheral part (hereinafter, referred to as an "inner periphery"), receives each of the divided light beams, and generates a photocurrent signal of a level corresponding to a quantity of received light.

Figure 3:
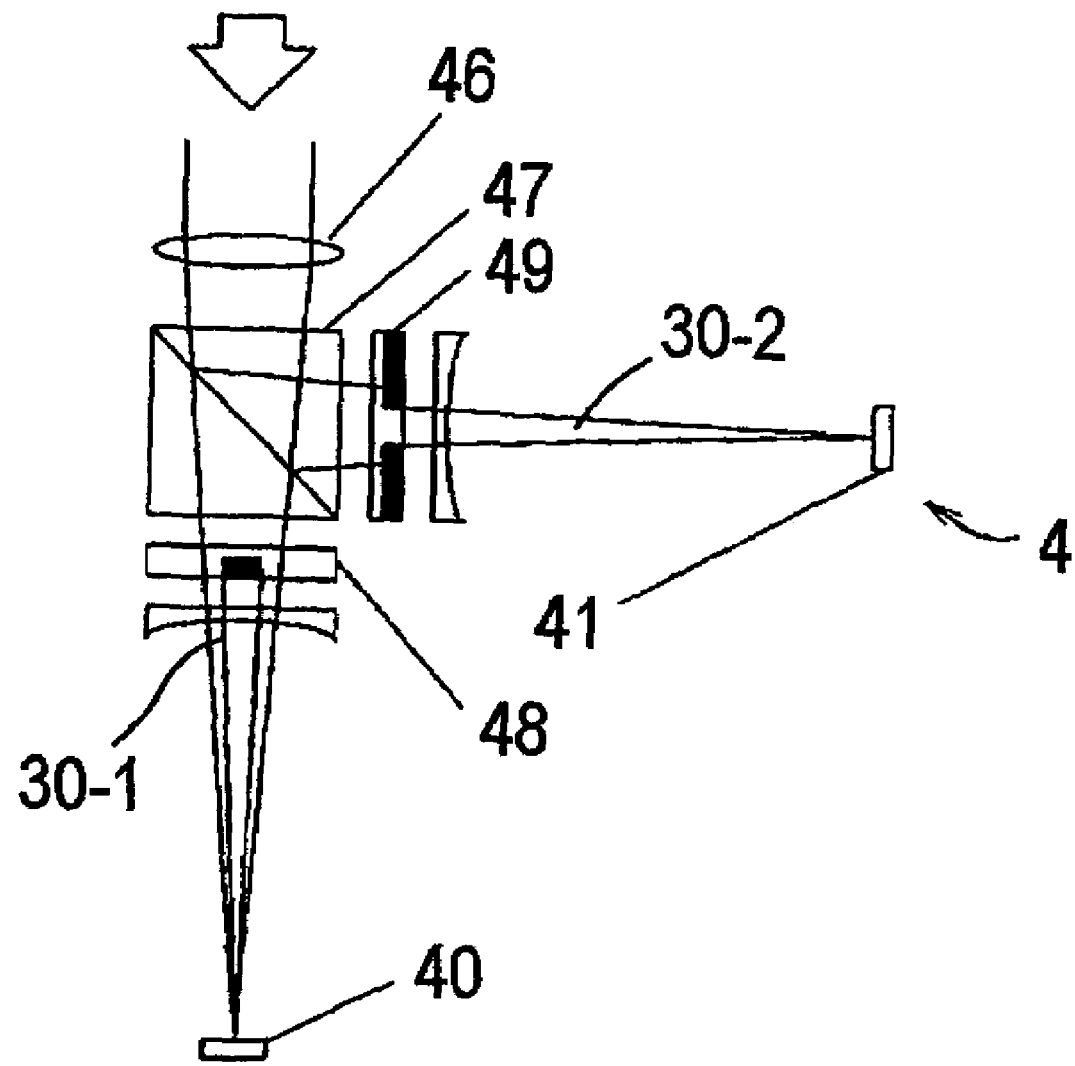
FIG. 3 is a diagram showing the specific configuration of a photodetector 4.

The configuration of the photodetector 4 will be described in detail. FIG. 3 shows the specific configuration of the photodetector 4. The photodetector 4 has an outer peripheral photodetector 40, an inner photodetector 41, a detection lens 46, a polarizing beam splitter 47, and two light shielding plates 48 and 49. The detection lens 46 gathers the light beam 30 reflected from the optical disc 20.

The polarizing beam splitter 47 transmits a half quantity of the reflected light beam 30 and reflects another half, so that the light beam 30 is divided into two part. The first light shielding plate 48 shields a light beam within a predetermined radius of the light beam 30 and generates a light beam 30-1 of the outer periphery (outer peripheral light beam). Meanwhile, the second light shielding plate 49 shields a light beam outside the predetermined radius of the light beam 30 and generates a light beam 30-2 of the inner periphery (inner light beam). The outer peripheral photodetector 40 and the inner photodetector 41 receive the outer peripheral light beam 30-1 and the inner light beam 30-2, respectively. Then, the photodetectors generate a photocurrent signal of a level corresponding to a quantity of received light.

Referring to FIG. 2 again, the drivers include a focus actuator driver 9 and a beam expander driver 33. The focus actuator driver 9 generates a focus drive signal of a predetermined level based on a control signal. The beam expander driver 33 generates a drive signal of a predetermined level based on a spherical aberration signal.

A disc motor 10 rotates the optical disc 20 at a predetermined number of revolutions based on an RPM control signal.

The preamplifier 11 has a current/voltage converter (I/V converter, not shown) and converts an inputted photocurrent signal to a voltage signal. The preamplifier 11 may be included in the optical head 6.

An optical disc controller (ODC) 110 performs processing based on a voltage signal corresponding to a quantity of received light and generates signals to the drivers 9 and 33, which will be described later. The ODC 110 can be constituted of one or more semiconductor chips. In such a configuration, the elements of the ODC 110, which will be described later, can be interpreted as the individual functions of the semiconductor chip.

The ODC 110 has a focus error (FE) generator 7, a microcomputer 8, a focus controller 17, a spherical aberration detector 31, a spherical aberration controller 35, an outer peripheral FE generator 44, an inner FE generator 45, an outer peripheral AS generator 70, an inner AS generator 71, an outer periphery normalized FE generator 72, and an inner periphery normalized FE generator 73.

The focus error generator 7 calculates the sum of an outer peripheral FE signal, which is an output signal of the outer peripheral FE generator 44, and an inner FE signal, which is an output signal of the inner FE generator 45, to generate an FE signal. Although the obtained FE signal is different in generating method from an FE signal generated by an astigmatism method, the characteristics are the same. Besides, the focus error generator 7 may generate an FE signal based on the sum of an outer periphery normalized FE signal and an inner periphery normalized FE signal. Also in this case, although the obtained FE signal is different in generating method from an FE signal generated by the astigmatism method, the characteristics are the same.

The microcomputer 8 provides instructions to start and end operations and to generate and output signals in the constitutional elements.

The focus controller 17 performs filtering operation on an input signal and compensation of a phase, a gain, and so on, and outputs an obtained signal.

The spherical aberration detector 31 detects state of spherical aberration produced at a beam spot based on a signal from the photodetector 4 and generates a spherical aberration signal. To be specific, the spherical aberration detector 31 calculates a difference between an output signal of the outer periphery normalized FE generator 72 and an output signal of the inner periphery normalized FE generator 73, generates a spherical aberration signal, and outputs the signal.

The spherical aberration controller 35 compensates a phase of the spherical aberration signal. After filter computing such as gain compensation is performed, the spherical aberration controller 35 outputs the processed spherical aberration signal to the beam expander driver 33.

The outer peripheral FE generator 44 and the inner FE generator 45 generate an outer peripheral FE signal and an inner FE signal based on an input signal by the astigmatism method and output the signals. These elements will be described later.

The outer peripheral AS generator 70 generates an outer peripheral AS signal, which indicates a light quantity of an outer peripheral light beam, based on an output signal of the preamplifier 11. The inner AS generator 71 generates an inner AS signal, which indicates a light quantity of an inner light beam, based on an output signal of the preamplifier 11.

The outer periphery normalized FE generator 72 normalizes the outer peripheral FE signal based on the outer peripheral AS signal to generate an outer periphery normalized FE signal. The inner periphery normalized FE generator 73 normalizes the inner FE signal based on the inner AS signal to generate an inner periphery normalized FE signal. The "normalization" indicates that the signal values of the outer peripheral FE signal/inner FE signal at each time are divided by the signal values of the outer peripheral AS signal/inner AS signal obtained at the same time. More specific explanation will be provided later.

Figure 4:
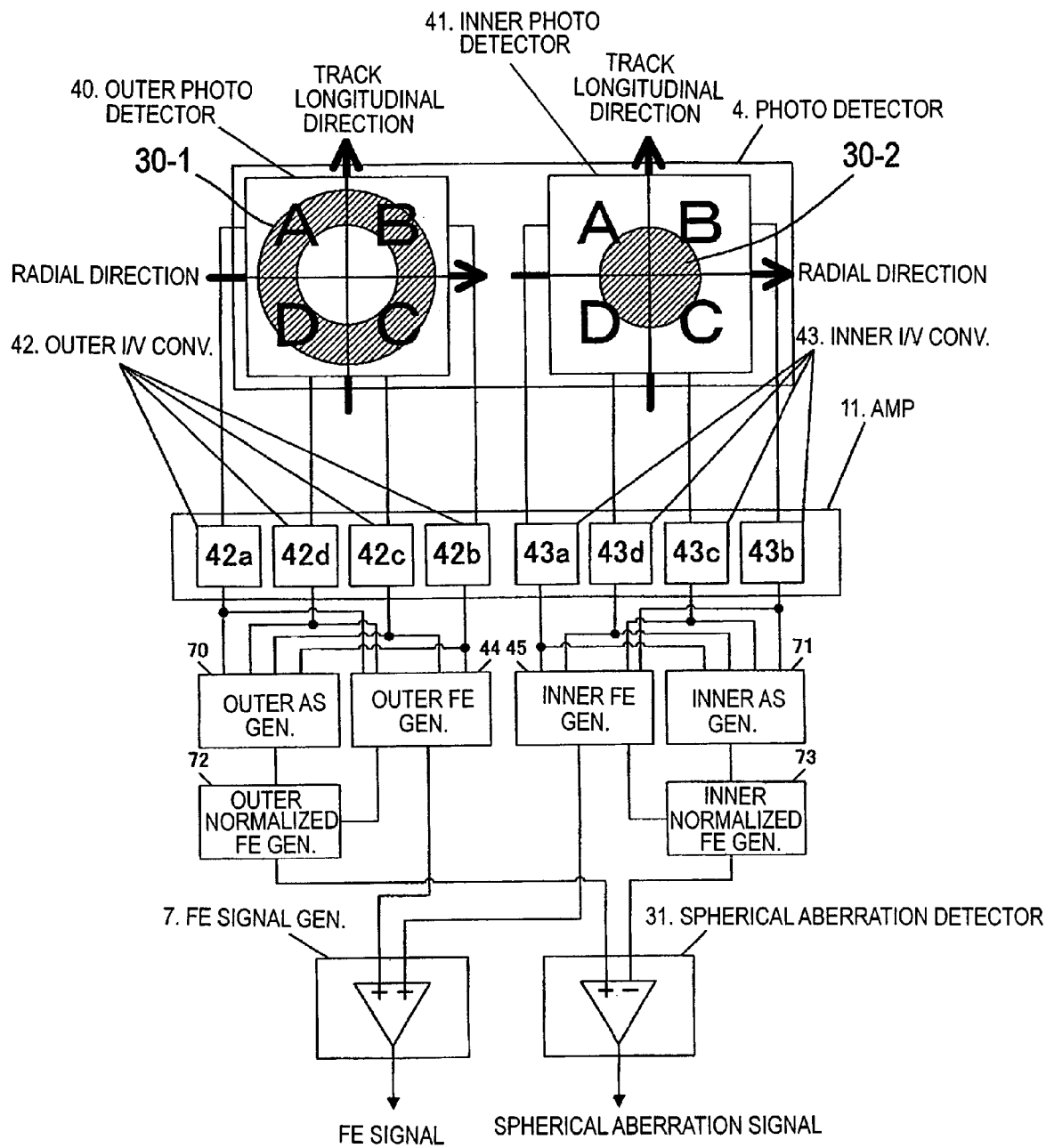
FIG. 4 is a connection diagram of the elements of the photodetector 4, a preamplifier 11, and an optical disc controller 110.

Referring to FIG. 4, the process of generating the above signals will be specifically described. FIG. 4 shows connections of the photodetector 4, the preamplifier 11, and the ODC 110. The photodetector 4 has an outer peripheral photodetector 40 and an inner photodetector 41. Since the same processing is performed on an outer peripheral light beam as an inner light beam, only processing on an outer peripheral light beam will be described below. Regarding processing on an inner light beam, the outer peripheral FE generator 44 is replaced with the corresponding element such as the inner FE generator 45.

The outer peripheral photodetector 40 is divided into four regions of A, B, C, and D. The regions each receive an outer peripheral light beam, generate photocurrent signals according to a light quantity, and output the signals to the corresponding outer peripheral I/V converters 42a, 42b, 42c, and 42d of the preamplifier 11. The photocurrent signals are subjected to current to voltage conversion in the outer peripheral I/V converters 42a, 42b, 42c, and 42d, and voltage signals are transmitted to the outer peripheral FE generator 44 and the outer peripheral AS generator 70.

The outer peripheral FE generator 44 calculates the sum of the voltage signals of the outer peripheral I/V converters 42a and 42c, the sum of the voltage signals of the outer peripheral I/V converters 42b and 42d, and a difference between the sums. As a result, the outer peripheral FE generator 44 obtains an outer peripheral FE signal according to the astigmatism method. The outer peripheral AS generator 70 adds the voltage signals of the outer peripheral I/V converters 42a, 42b, 42c, and 42d and generates an outer peripheral AS signal indicating a total light quantity of the outer peripheral light beam. By dividing the outer peripheral FE signal by the outer peripheral AS signal, the outer periphery normalized FE generator 72 obtains an outer periphery normalized FE signal, in which the outer peripheral FE signal is normalized by a total light quantity of the outer periphery.

Referring to FIG. 5, the spherical aberration control of the optical disc drive 100 will be described below. FIG. 5 shows the processing steps of the optical disc drive 100. First, in step 501, the light source 3 irradiates the optical disc 20 with the light beam 30. Next, in step 502, the photodetector 4 separately receives an inner light beam and an outer peripheral light beam that have been reflected by the optical disc 20, and the photodetector 4 outputs photocurrent signals according to light quantities. In step 503, the preamplifier 11 converts the photocurrent signals to voltage signals.

In step 504, the outer peripheral FE generators 44 and 45 generate the focus error signals of the outer peripheral light and the inner light based on the voltage signals. Meanwhile, in step 505, the outer peripheral AS generator 70 and the inner AS generator 71 generate the light quantity signals of the outer peripheral light and the inner light based on the voltage signals. Note that steps 504 and 505 may be performed in any order.

In step 506, the outer periphery normalized FE generator 72 and the inner periphery normalized FE generator 73 normalize the focus error signals of the outer peripheral light and the inner light based on the light quantity signals. In step 507, the spherical aberration detector 31 generates a spherical aberration signal according to a quantity of spherical aberration based on the normalized focus error signals. Finally, in step 508, the beam expander driver 33 generates a drive signal based on the spherical aberration signal and corrects spherical aberration based on the signal value of the drive signal. The above processing realizes spherical aberration control.

Referring to FIGS. 6A to 6I, the following will describe the signals obtained by the processing of the optical disc drive 100 according to the present embodiment. In the following explanation, spherical aberration control is not performed.

Figure 6A:
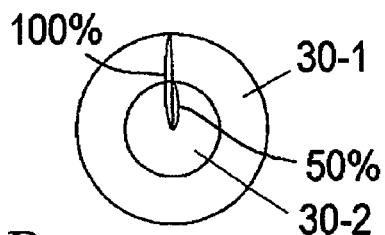
FIG. 6A shows a light beam divided into an outer peripheral light beam 30-1 and an inner light beam 30-2 at the position of a 50% radius from the center of a received light beam.
Figure 6B:
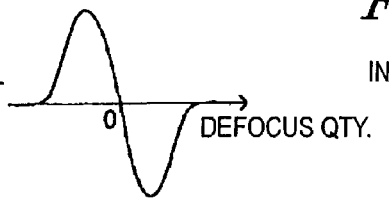
FIG. 6B is a waveform chart showing an outer peripheral FE signal.
Figure 6C:
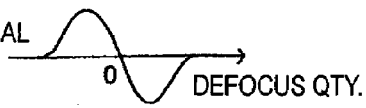
FIG. 6C is a waveform chart showing an inner FE signal.
Figure 6D:
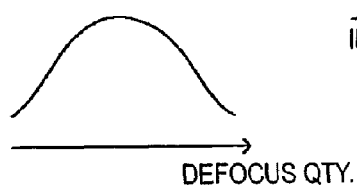
FIG. 6D is a waveform chart showing an outer peripheral AS signal.
Figure 6E:
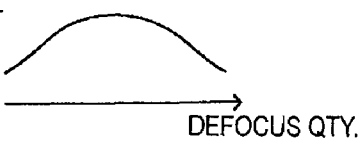
FIG. 6E is a waveform chart showing an inner AS signal.
Figure 6F:
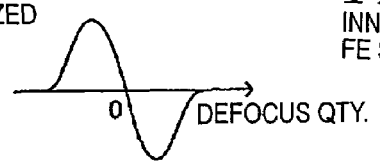
FIG. 6F is a waveform chart showing an outer peripheral normalized FE signal.
Figure 6G:
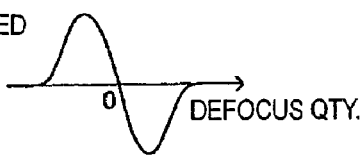
FIG. 6G is a waveform chart showing an inner normalized FE signal.
Figure 6H:
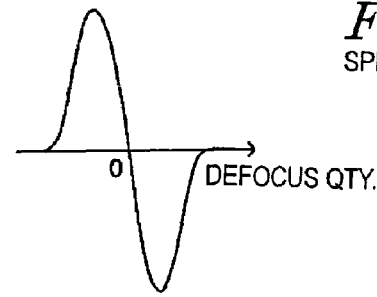
FIG. 6H is a waveform chart showing an FE signal.
Figure 6I:
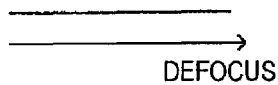
FIG. 6I is a chart showing the waveform of a spherical aberration signal.

FIG. 6A shows a light beam divided into the outer peripheral light beam 30-1 and the inner light beam 30-2 at the position of a 50% radius from the center of the received light beam. Such a light beam can be obtained by adjusting the first and the second light shielding plates 48 and 49. FIG. 6B shows the waveform of the outer peripheral FE signal. Similarly, FIG. 6C indicates the waveform of the inner FE signal, FIG. 6D shows the waveform of the outer peripheral AS signal, FIG. 6E shows the waveform of the inner AS signal, FIG. 6F shows the waveform of the outer periphery normalized FE signal, FIG. 6G shows the waveform of the inner periphery normalized FE signal, FIG. 6H shows the waveform of the FE signal, and FIG. 6I shows the waveform of the spherical aberration signal. As described above, the sum of the outer peripheral FE signal shown in FIG. 6B and the inner FE signal shown in FIG. 6C is the FE signal of FIG. 6H, and a signal obtained by subtracting the inner periphery normalized FE signal of FIG. 6G from the outer periphery normalized FE signal of FIG. 6F is the spherical aberration signal of FIG. 6I. The vertical axes indicate the voltages of the signals and the horizontal axes indicate defocusing quantities.

When a light beam is divided into the outer peripheral light beam 30-1 and the inner light beam 30-2 as shown in FIG. 6A, the outer periphery is larger in light quantity than the inner periphery. Thus, the outer peripheral FE signal of FIG. 6B becomes larger in amplitude than the inner FE signal of FIG. 6C. Further, the outer peripheral AS signal of FIG. 6D becomes larger in amplitude than the inner AS signal of FIG. 6E at the same ratio as that of the above two signals. As a result, the outer periphery normalized FE signal at the normalization of the outer peripheral FE signal of FIG. 6B based on the outer peripheral AS signal of FIG. 6D is equal in amplitude to the inner periphery normalized FE signal at the normalization of the inner FE signal of FIG. 6C based on the inner AS signal of FIG. 6E. Hence, the value of the spherical aberration signal with the waveform (i) is maintained constant. The spherical aberration signal is a difference signal of the outer periphery normalized FE signal and the inner periphery normalized FE signal. As is understood from FIG. 6I, the spherical aberration signal is not changed according to a defocusing quantity or is not affected by defocusing.

Figure 7A:
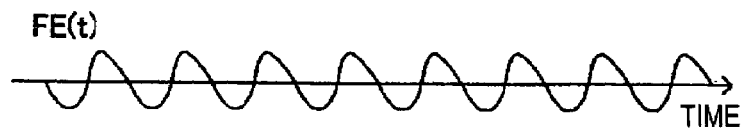
FIG. 7A is a waveform chart showing an FE signal.
Figure 7B:
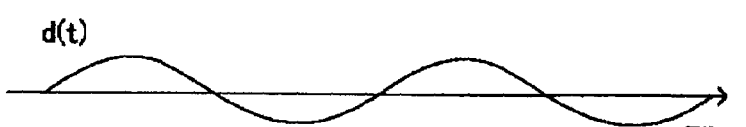
FIG. 7B is a waveform chart showing a change in thickness of an optical disc at the irradiating position of a light beam.
Figure 7C:
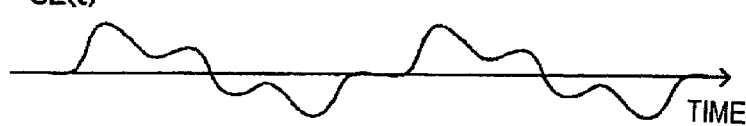
FIG. 7C is a waveform chart showing a conventional spherical aberration signal.
Figure 7D:
FIG. 7D is a waveform chart showing a spherical aberration signal of the present embodiment.

Referring to FIGS. 7A to 7D, the following will describe that the spherical aberration signal obtained by the processing of the optical disc 100 is not affected by defocusing. FIG. 7A shows the waveform of the FE signal. FIG. 7B shows a change in thickness of the optical disc at the irradiating position of a light beam. FIGS. 7C and 7D show the waveforms of the spherical aberration signals according to the conventional art and the present embodiment. The vertical axes indicate the voltages of the signals, and the horizontal axes indicate time. In the following explanation, focus control is performed but spherical aberration control is not performed in the optical disc drive.

In focus control, defocus beyond a control band cannot be tracked and appears as an FE signal FE(t) of FIG. 7A. At this point, when a spherical aberration signal is obtained by a conventional method, the signal is affected by defocusing, so that an uneven thickness d(t) of the optical disc in FIG. 7B has a signal waveform SE(t) of FIG. 7C. The signal waveform SE(t) is expressed by the following equation: $SE(t) = FE(t) \, K + d(t)$ where K indicates a fixed predetermined value. Thus, the conventional method cannot precisely detect a spherical aberration caused by the uneven thickness of the optical disc.

On the other hand, as described before, since the spherical aberration signal of the optical disc drive 100 according to the present embodiment is not affected by defocusing, as shown in FIG. 7D, it is possible to precisely detect a spherical aberration caused by the uneven thickness of the optical disc. Therefore, by correcting a spherical aberration based on the spherical aberration signal of the present embodiment, a spherical aberration can be corrected with high accuracy and an optical disc drive can be obtained with higher reliability of reading and writing operation.

Embodiment 2

Figure 8:
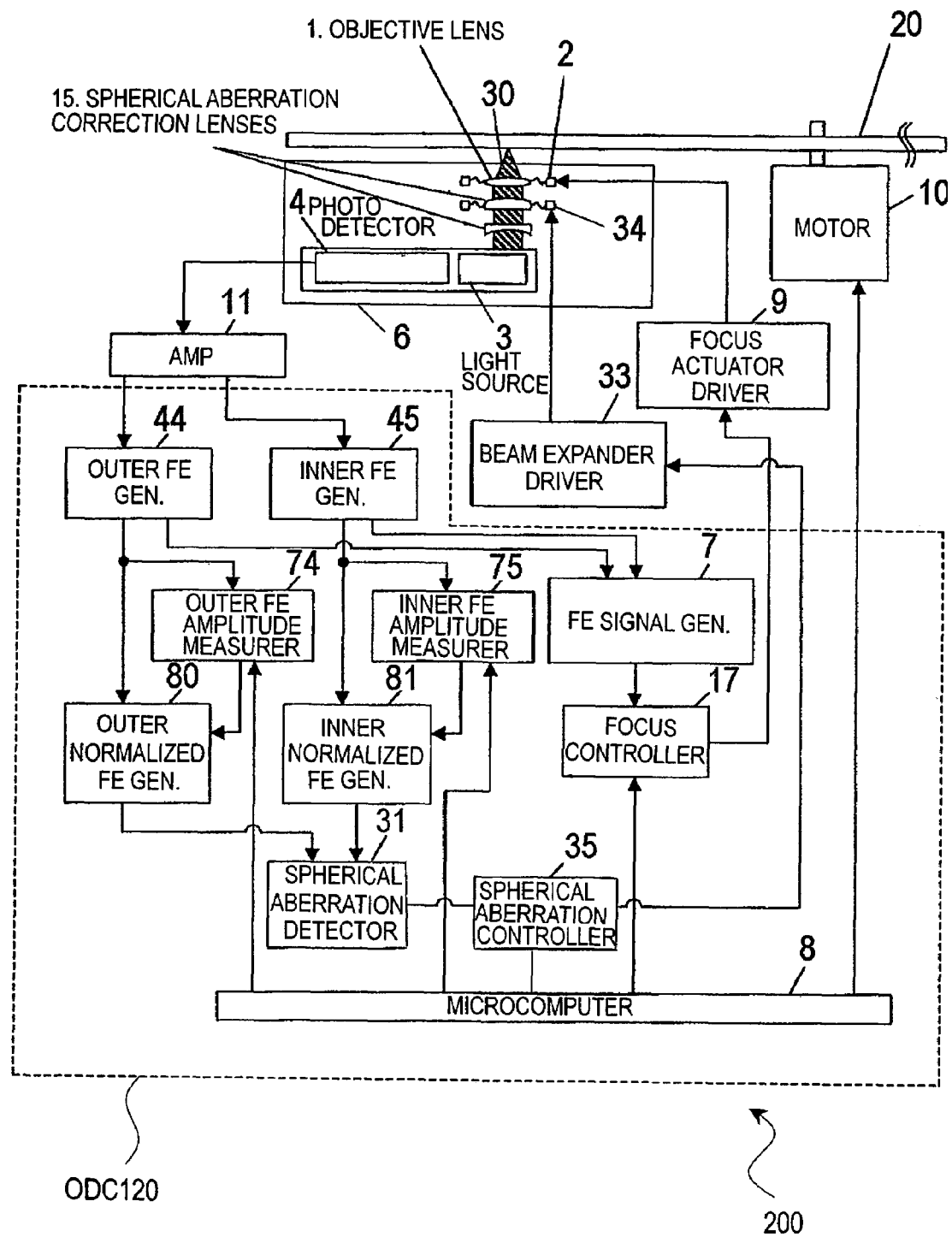
FIG. 8 is a block diagram showing an optical disc drive 200 according to Embodiment 2.

Referring to FIG. 8, a second embodiment of an optical disc according to the present invention will be described. FIG. 8 shows configuration of the functional block of an optical disc drive 200 according to the present embodiment. As with FIG. 2, an optical disc 20 is not an element but is shown in FIG. 8 for convenience of explanation.

The optical disc drive 200 of the present embodiment is different from the optical disc drive 100 of a first embodiment in that a focus error signal is normalized by using the amplitude of the focus error signal and a spherical aberration is controlled. The difference is indicated in an optical disc controller (ODC) 120 of the optical disc drive 200. Namely, the ODC 120 of the present embodiment is different from the ODC 110 of a first embodiment in an outer peripheral FE amplitude measurer 74, an inner FE amplitude measurer 75, an outer periphery normalized FE generator 80, and an inner periphery normalized FE generator 81. The following will describe these elements. Some elements of the optical disc drive 200 have the same functions and operations as those of the optical disc drive 100. Such elements are indicated by the same reference numerals and names and the explanation thereof is omitted.

In FIG. 8, the outer peripheral FE amplitude measurer 74 measures the amplitude of an outer peripheral FE signal in response to instructions from a microcomputer 8 to start and end measurement. The outer peripheral FE signal is an output signal of an outer peripheral FE generator 44. The outer peripheral FE amplitude measurer 74 outputs outer peripheral FE amplitude, which is the measurement result, as an outer peripheral FE amplitude signal to an outer periphery normalized FE generator 80.

Similarly, the inner FE amplitude measurer 75 measures the amplitude of an inner FE signal in response to instructions from the microcomputer 8 to start and end measurement. The inner FE signal is an output signal of an inner FE generator 45. The inner FE amplitude measurer 75 outputs inner FE amplitude, which is the measurement result, as an inner FE amplitude signal to an inner periphery normalized FE generator 81.

The outer periphery normalized FE generator 80 normalizes the outer peripheral FE signal based on the outer peripheral FE amplitude signal and generates an outer periphery normalized FE signal. The inner periphery normalized FE generator 81 normalizes the inner FE signal based on the inner FE amplitude signal and generates an inner periphery normalized FE signal. The "normalization" indicates that the signal values of the outer peripheral FE signal/inner FE signal at each time are divided by the signal values of the outer peripheral FE amplitude signal/inner FE amplitude signal obtained at the same time. After the normalization, a spherical aberration detector 31 calculates a difference between the outer periphery normalized FE signal and the inner periphery normalized FE signal, generates a spherical aberration signal, and outputs the signal. Then, a spherical aberration is adjusted based on the spherical aberration signal.

Referring to FIGS. 9A and 9B and FIGS. 10A to 10D, the outer peripheral FE amplitude measurer 74 and the inner FE amplitude measurer 75 will be described in detail.

Figure 9A:
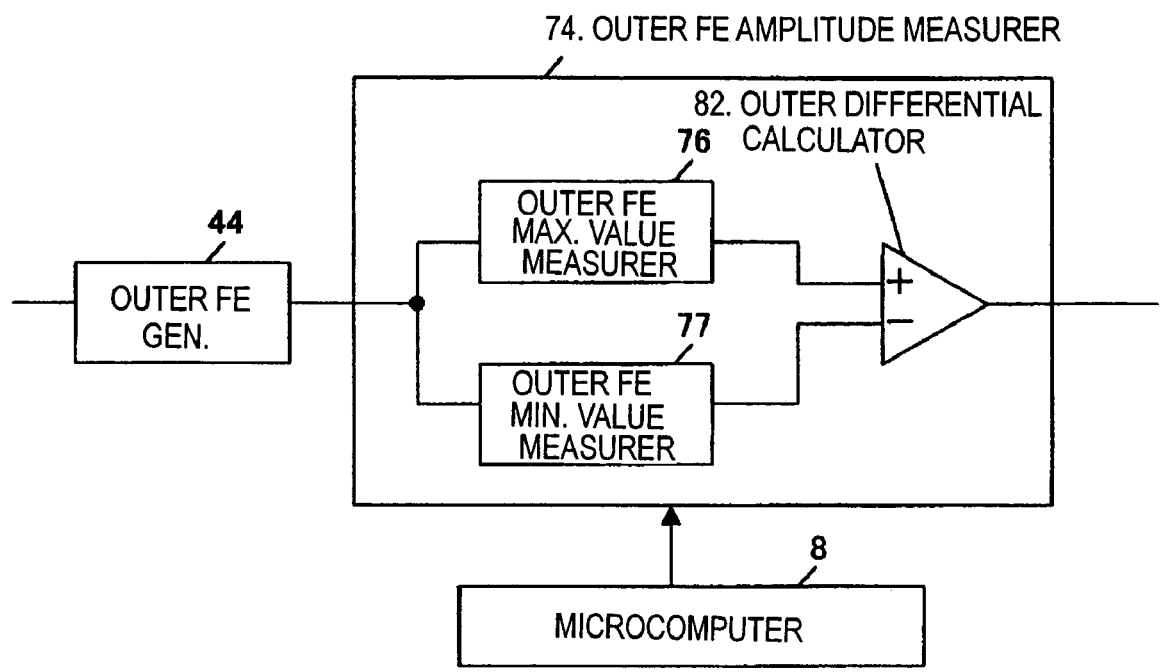
FIG. 9A is a block diagram showing an outer peripheral FE amplitude measurer 74.
Figure 9B:
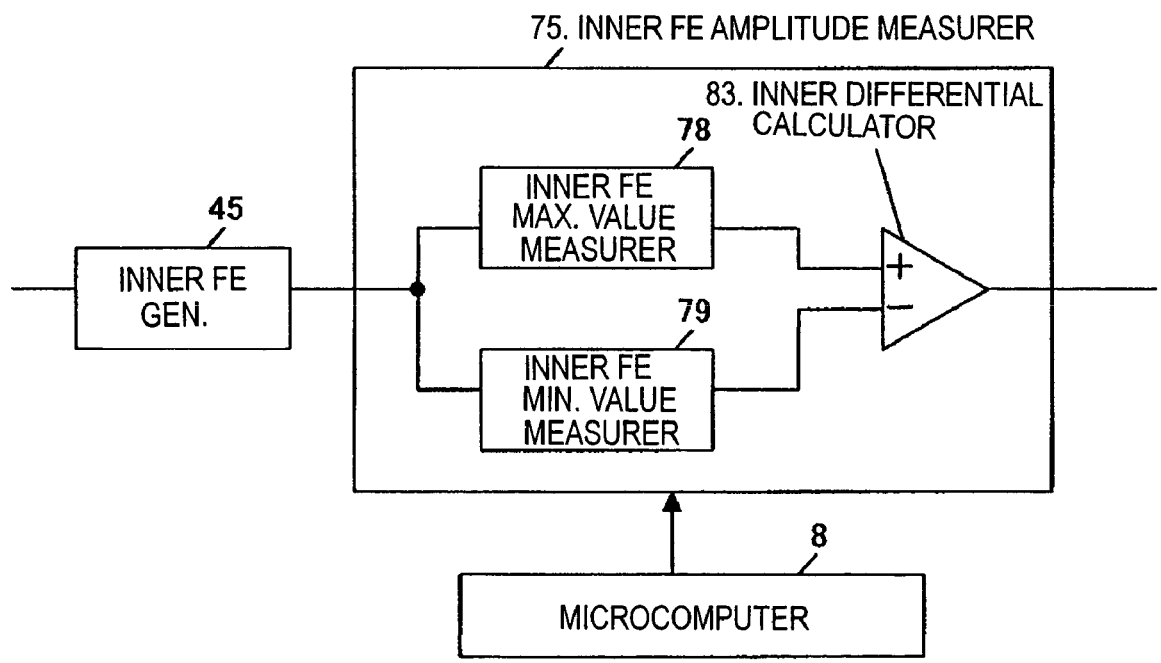
FIG. 9B is a block diagram showing an inner FE amplitude measurer 75.

FIG. 9A shows a block configuration of the outer peripheral FE amplitude measurer 74. FIG. 9B shows a block configuration of the inner FE amplitude measurer 75. The outer peripheral FE amplitude measurer 74 and the inner FE amplitude measurer 75 are different from each other only in that an operation is performed in response to the outer peripheral FE signal or the inner FE signal. Hence, the following will mainly discuss the configuration and operations of the outer peripheral FE amplitude measurer 74.

As shown in FIG. 9A, the outer peripheral FE amplitude measurer 74 includes an outer peripheral FE maximum value measurer 76, an outer peripheral FE minimum value measurer 77, and an outer peripheral differential computing unit 82. The outer peripheral FE maximum value measurer 76 (hereinafter, referred to as a "maximum value measurer 76") and the outer peripheral FE minimum value measurer 77 (hereinafter, referred to as a "minimum value measurer 77") receive the outer peripheral FE signal from the outer peripheral FE generator 44 and starts operating according to the instructions of the microcomputer 8 to start and end measurement. Namely, the maximum value measurer 76 detects a maximum level (maximum value) of the outer peripheral FE signal and outputs an outer peripheral FE maximum value signal, and the minimum value measurer 77 detects a minimum level (minimum value) of the outer peripheral FE signal and outputs an outer peripheral FE minimum value signal.

The outer peripheral differential computing unit 82 (hereinafter, referred to as a "computing unit 82") calculates a difference between the outer peripheral FE maximum value signal and the outer peripheral FE minimum signal and outputs an outer peripheral FE amplitude signal. On the other hand, the inner differential computing unit 83 (hereinafter, referred to as a "computing unit 83") of FIG. 9B calculates a difference between the maximum value and the minimum value of the inner FE signal and outputs an inner FE amplitude signal. Note that computing units 82 and 83 continue to output the outer and the inner FE amplitude signals even after they receive the instructions of the microcomputer 8 to end measurement.

Portion (a) of FIG. 10 shows an exemplary waveform of the outer peripheral FE signal. The vertical axis indicates a voltage of the signal and the horizontal axis indicates time, also in the charts below. It is assumed that the outer peripheral FE signal has the maximum value FEa (>0) at time t2 and the minimum value FEb (<0) at time t4. Portion (b) of FIG. 10 shows an exemplary waveform of the outer peripheral FE maximum value signal which is generated based on the outer peripheral FE signal of portion (a). The outer peripheral FE maximum signal follows the outer peripheral FE signal until time t2 and stores a value FEa after time t2. Portion (c) of FIG. 10 shows an exemplary waveform of the outer peripheral FE minimum value signal which is generated based on the outer peripheral FE signal of portion (a). The outer peripheral FE minimum value signal sequentially stores minimum values before time t4 and stores a value FEb after time t4. Portion (d) of FIG. 10 shows an exemplary waveform of a focus drive signal. The signal is outputted from a focus controller 17 to a focus actuator driver 9 at time t1 and is used for amplitude search of the outer peripheral FE signal.

Referring to FIG. 8 again, the spherical aberration control of the optical disc drive 200 will be described below. First, the microcomputer 8 instructs the focus controller 17 to output the focus drive signal of portion (d) of FIG. 10 and simultaneously instructs the maximum value measurer 76 and the minimum value measurer 77 to start measurement.

Then, a focus actuator driver 9 moves an objective lens 1 perpendicularly to the information storage layer of the optical disc 20 according to the focus drive signal and brings the objective lens 1 close to the optical disc 20. By bringing the object lens 1 close to the optical disc 20, a beam spot is moved perpendicularly to the information storage layer of the optical disc 20 and the outer peripheral FE signal has the maximum value at time t2 (FIG. 7A).

The focus actuator driver 9 further brings the object lens 1 closer to the optical disc 20 and the approach is suspended at time t3 when the beam spot passes through a position coincident with the information storage layer of the optical disc 20. Then, after time t3, the focus actuator driver 9 changes the moving direction to a direction of separating the object lens 1 from the optical disc 20. As a result, the outer peripheral FE signal has the minimum value at time t4. After the beam spot passes through a position coincident with the information storage layer of the optical disc 20, the driving of the objective lens 1 is completed at time t5.

During time t1 and t5, the maximum value measurer 76 outputs the signal shown in portion (b) of FIG. 10 and the minimum value measurer 77 outputs the signal shown in portion (c) of FIG. 10. Then, at time t5, the computing unit 82 calculates a difference between the outer peripheral FE maximum value signal having the value FEa and the outer peripheral FE minimum value signal having the value FEb and outputs amplitude FEpp of the outer peripheral FE signal. The FE amplitude FEpp is obtained by the following equation:

$$FEpp = FEa - FEb = |FEa| + |FEb|$$

By dividing each value of the outer peripheral FE signal by each value of the outer peripheral FE amplitude signal, the outer periphery normalized FE generator 80 obtains an each value of an outer periphery normalized FE signal, in which the outer peripheral FE signal is normalized by the outer peripheral FE amplitude signal. The inner FE amplitude measurer 75 also measures the amplitude of the inner FE signal as the outer peripheral FE amplitude measurer 74 and outputs the inner FE amplitude signal. By dividing each value of the inner FE signal by each value of the inner FE amplitude signal, the inner periphery normalized FE generator 81 obtains each value of an inner periphery normalized FE signal, in which the inner FE signal is normalized by the inner FE amplitude signal.

The spherical aberration detector 31 generates a spherical aberration signal based on a difference between the outer periphery normalized FE signal and the inner periphery normalized FE signal, and a spherical aberration controller 35 performs predetermined processing on the signal. When a beam expander driver 33 generates a drive signal based on the processed spherical aberration signal, a correction actuator 34 changes an interval between two spherical aberration correction lenses 15 according to the signal value of the drive signal. As a result, the path of light changes in optical characteristics and correction is performed so as to have the spherical aberration of substantially 0. The above processing achieves spherical aberration control.

According to the above processing, each of the signal values of the outer peripheral FE amplitude signal and the inner FE amplitude signal have the same ratio as those of the outer peripheral FE signal and the inner FE signal. Thus, as the processing of a first embodiment, the outer peripheral FE signal and the inner FE signal are normalized based on the outer peripheral FE amplitude signal and the inner amplitude signal, and the spherical aberration signal can be obtained based on the difference between the outer and the inner periphery FE signals. As a result of the above processing, as shown in FIG. 6I, the spherical aberration signal can be obtained as a signal maintained at a constant value without being affected by defocusing.

Besides, the explanation on a first Embodiment shown in FIGS. 7A to 7D can be used as it is for the present embodiment. Namely, as described above, the spherical aberration signal obtained by the processing of the present embodiment is not affected by defocusing. Thus, as shown in FIG. 7D, it is possible to precisely detect a spherical aberration caused by an uneven thickness of the optical disc. Therefore, by correcting a spherical aberration based on the spherical aberration signal of the present embodiment, a spherical aberration can be corrected with high accuracy and an optical disc drive can be obtained with higher reliability of reading and writing operation.

Embodiment 3

Referring to FIG. 11, a third embodiment of an optical disc according to the present invention will be described. FIG. 11 shows the configuration of the functional block of an optical disc drive 300. As with FIG. 2, an optical disc 20 is not an element of the optical disc drive 300 but is shown in FIG. 11 for convenience of explanation.

One of primary features of the optical disc drive 300 according to the present embodiment is that a spherical aberration signal is normalized and the spherical aberration is controlled based on the normalized signal. For an optical disc having the recorded area and the unrecorded area, the object of the normalization of a spherical aberration signal is to remove the influence exerted on the spherical aberration signal depending upon whether a recorded area or an unrecorded area is read. The processing is realized by a photodetector 5, a preamplifier 12, and an optical disc controller (ODC) 130 of the optical disc drive 300. These elements will be mainly described below. Some elements of the optical disc drive 300 have the same functions and operations as those of an optical disc drive 100 or a conventional optical disc 140. Such elements are indicated by the same reference numerals and names and the explanation thereof is omitted. An optical disc 20 of the present embodiment may be a recordable medium such as PD, DVD-RAM, DVD-RW, DVD+RW, CD-RW and BD-RE that are made of a phase change material as well as BD-R, DVD-R, DVD+R, CD-R and so on that have an information storage layer made of an organic dye.

First, referring to FIG. 12, the photodetector 5 and the preamplifier 12 of the present embodiment will be described below. FIG. 12 shows the connecting relationship of the elements of the photodetector 5, the preamplifier 12, and the ODC 130.

The photodetector 5 is configured so that a total photodetector 14 having four light-receiving areas is added to the photodetector 4 of a first embodiment. Regarding the same elements as the photodetector 4 of a first embodiment, explanation is omitted. The total photodetector 14 will be described below. The total photodetector 14 receives the entire light beam, generates a photocurrent signal corresponding to a total light quantity, and outputs the signal to corresponding I/V converters 65a, 65b, 65c, and 65d of the preamplifier 12. The I/V converters 65a, 65b, 65c, and 65d perform current to voltage conversion on the photocurrent signal and transmit a voltage signal to a reflected light quantity detector 13. Note that the reflected light quantity detector 13 receives voltage signals outputted from the areas of an outer peripheral I/V converter 42 and an inner I/V converter 43 in addition to the voltage signal corresponding to the light quantity of the entire light beam, and the reflected light quantity detector 13 outputs a reflected light quantity signal indicating a quantity of reflected light. Hence, it is possible to improve an signal-to-noise ratio of the light quantity signal. However, it is not always necessary to use the total photodetector 14. Total reflected light may be obtained by using an outer peripheral photodetector 40 and an inner photodetector 41. In order to introduce the entire light beam to the total photodetector 14, for example, the same element as a polarizing beam splitter 47 is disposed between a detection lens 46 and a polarizing beam splitter 47 of FIG. 3, reflected light is emitted to the total photodetector 14, and transmitted light is emitted to the polarizing beam splitter 47. On the other hand, a focus error generator 7 and a spherical aberration detector 31 output an FE signal and a spherical aberration signal, respectively. Since the processing is the same as the optical disc drive 100 of a first embodiment, the explanation thereof is omitted.

Referring to FIG. 11 again, a normalized spherical aberration detector 38 normalizes a spherical aberration signal based on a reflected light quantity signal outputted from the reflected light quantity detector 13 and outputs a normalized spherical aberration signal. The "normalization" indicates that the signal value of the spherical aberration signal at each time is divided by the signal value of the reflected light quantity signal obtained at the same time. Thereafter, a spherical aberration controller 35 compensates the phase, gain, and so on of the normalized spherical aberration signal, performs filter computing, and generates a drive signal based on the processed normalized spherical aberration signal. The drive signal is outputted to a beam expander driver 33. The beam expander driver 33 generates a drive signal of a predetermined level based on the normalized spherical aberration signal.

Referring to FIGS. 13A to 13C, the following will describe the influence on the waveform of a signal at the read operation of the optical disc 20 including a recorded area and an unrecorded area. FIG. 13A shows the waveform of the spherical aberration signal, FIG. 13B shows the waveform of the reflected light quantity signal, and FIG. 13C shows the waveform of the normalized spherical aberration signal. The vertical axes indicate the voltages of the signals and the horizontal axes indicate time. In the following explanation, focus control is performed but spherical aberration control is not performed in the optical disc drive.

When the optical disc 20 is read where an information storage layer 29 includes the recorded area having written data and the unrecorded area not having written data, the spherical aberration signal of FIG. 13A is obtained. The spherical aberration signal is obtained by reading data in the recorded area until time t1. A spherical aberration caused by the uneven thickness of a protective layer 25 of the optical disc 20 appears as a spherical aberration signal with a constant sensitivity. Subsequently, a light beam is emitted to the unrecorded area between time t1 and t2. Since the unrecorded area is higher in sensitivity to detect a spherical aberration than the recorded area, the spherical aberration signal increases in amplitude. Thereafter, the read operation for the recorded area is restarted after time t2. Thus, the detection sensitivity of spherical aberration becomes equal to sensitivity before time t1, and the amplitude of the spherical aberration signal returns to the level before time t1.

As shown in FIG. 13B, a quantity of reflected light differs in detected value between the recorded area and the unrecorded area. The quantity of reflected light for the unrecorded area represents larger detected value. Further, a quantity of reflected light is proportionate to a change in sensitivity of the spherical aberration signal shown in FIG. 13A. In other words, the spherical aberration signal changes in detection sensitivity according to a change in quantity of reflected light in the recorded area and the unrecorded area.

Hence, by dividing the spherical aberration signal by the reflected light quantity signal, the obtained normalized spherical aberration signal (FIG. 13C) permits precise detection of a spherical aberration, which is caused by an uneven thickness of a protective layer of the optical disc 20, with a constant detection sensitivity in both of the recorded area and the unrecorded area.

The following will examine the spherical aberration signal of FIG. 13A as a conventional spherical aberration signal. Since the read operation of the recorded area and the unrecorded area are different in sensitivity to detect a spherical aberration, an open-loop gain of the spherical aberration control using the spherical aberration signal is different between the read operation of the recorded area and the unrecorded area, resulting in unstable spherical aberration control.

However, as shown in FIG. 13C, since the normalized spherical aberration signal is not affected by a change in quantity of reflected light of the recorded area and the unrecorded area, it is possible to precisely detect a spherical aberration caused by an uneven thickness of the optical disc. Hence, when a spherical aberration is corrected based on the normalized spherical aberration signal of the present embodiment, it is possible to correct a spherical aberration with high accuracy, thereby providing an optical disc drive capable of writing and reading with higher stability.

Although the above explanation described that the reflected light quantity detector 13 detects a total quantity of light reflected from the information storage layer of the optical disc 20, the reflected light quantity detector 13 may detect only a quantity of light received by the photodetector where the largest light quantity is detected. Also when the quantity of received light is used as the reflected light quantity signal, the normalized spherical aberration signal is not affected by a change in quantity of reflected light of the recorded area and the unrecorded area. Therefore, also in this case, the above effect can be achieved and an optical disc drive can be offered with a simple circuit configuration. In optical disc drives according to the first and second embodiments, reflected light is received by the two photodetectors of the outer peripheral photodetector 40 and the inner photodetector 41 and the light quantity of the reflected light is efficiently used without the provision of a photodetector for detecting a total quantity of light. Thus, it is possible to detect a spherical aberration signal and a focus error signal with a high signal-to-noise ratio.

The optical disc drive according to the foregoing embodiments perform operations according to computer programs. The computer programs are executed by a CPU (not shown) for controlling the operations of the whole optical disc drive. The computer programs can be recorded in a optical recording medium represented by an optical disc, a semiconductor recording medium represented by an SD memory card and an EEPROM, and a recording medium such as a magnetic recording medium represented by a flexible disc. Further, the optical disc drive 100 can receive computer programs via a telecommunications line such as the Internet as well as recording mediums. Such computer programs are distributed in commerce as computer program products.

The optical disc controller can be formed by one or more semiconductor chip circuits. In such a configuration, the elements included in the optical disc controller can be interpreted as the individual functions of the semiconductor chip circuit. Moreover, the above computer programs are recorded in the recorded area of the semiconductor chip circuit, and the microcomputer 8 performs processing according to the computer programs.

Since the optical disc drive of the present invention generates a spherical aberration signal not being affected by defocusing, it is possible to accurately detect a spherical aberration caused by an uneven thickness of the optical disc and accurately detect a spherical aberration not being affected by the defocusing of focus control. Thus, the optical disc drive is useful for writing/reading data with high density.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical disc drive for reading data from an optical disc and/or writing data on an optical disc having an information storage layer, comprising:

a light source;

a collector optics for focusing light from the light source;

a light-receiving section for receiving a peripheral part of the light reflected by the information storage layer to generate a first detection signal and for receiving a non-peripheral part of the light to generate a second detection signal;

a first focus signal generating section for generating a first focus signal based on the first detection signal according to a focusing state of the light in the peripheral part;

a second focus signal generating section for generating a second focus signal based on the second detection signal according to a focusing state of the light in the non-peripheral part;

a first light quantity generating section for generating a first light quantity signal based on the first detection signal according to a total light quantity of the peripheral part;

a second light quantity generating section for generating a second light quantity signal based on the second detection signal according to a total light quantity of the non-peripheral part;

a first normalizing section for generating a first normalized signal by normalizing the first focus signal based on the first light quantity signal;

a second normalizing section for generating a second normalized signal by normalizing the second focus signal based on the second light quantity signal; and a detecting section for generating a spherical aberration signal based on the first normalized signal and the second normalized signal according to a quantity of spherical aberration produced at a focusing position of the light, wherein the detecting section calculates a difference between the first normalized signal and the second normalized signal to generate the spherical aberration signal.

2. An optical disc drive for reading data from an optical disc and/or writing data on an optical disc having an information storage layer, comprising:

a light source;

a collector optics for focusing light from the light source;

a light-receiving section for receiving the light reflected by the information storage layer to generate a detection signal;

a spherical aberration detecting section for generating a spherical aberration signal based on the detection signal according to a quantity of spherical aberration produced at a focusing position of the light;

a light quantity detecting section for generating a light quantity signal based on the detection signal according to a total quantity of the light; and a normalized aberration detecting section for normalizing the spherical aberration signal based on the light quantity signal to generate a normalized spherical aberration signal.

3. The optical disc drive according to claim 2, wherein the light-receiving section has light-receiving elements including a first light-receiving element and a second light-receiving element, and wherein, in receipt of the light, the first light-receiving element receives a peripheral part of the light reflected by the information storage layer and the second light-receiving element receives a non-peripheral part of the light, and as a result of the reception, at least one of a first detection signal generated in the first light-receiving element and a second detection signal generated in the second light-receiving element is outputted to the light quantity detecting section.

4. The optical disc drive according to claim 3, wherein the light-receiving section further includes a third light-receiving element for receiving an entire light to generate a third detection signal, and wherein the light-receiving section outputs at least one of a first detection signal generated in the first light-receiving element and a second detection signal generated in the second light-receiving element and the third detection signal to the light quantity detecting section.

5. The optical disc drive according to claim 3, wherein each of the light-receiving elements generates a detection signal having a signal level according to received light quantity, and wherein the light-receiving section outputs one of the detection signals having a maximum signal level to the light quantity detecting section.

6. A method for reading data from an optical disc and/or writing data on an optical disc having an information storage layer, comprising steps of:

focusing light from a light source;

receiving the light reflected by the information storage layer to generate a detection signal;

generating a spherical aberration signal based on the detection signal according to a quantity of spherical aberration produced at a focusing position of the light;

generating a light quantity signal based on the detection signal according to a total quantity of the light; and normalizing the spherical aberration signal based on the light quantity signal to generate a normalized spherical aberration signal.

* * * * *